US012147880B2

(12) United States Patent
Baumard

(10) Patent No.: US 12,147,880 B2
(45) Date of Patent: Nov. 19, 2024

(54) AUTONOMOUS DETECTION OF INCONGRUOUS BEHAVIORS

(71) Applicant: Philippe Baumard, San Francisco, CA (US)

(72) Inventor: Philippe Baumard, San Francisco, CA (US)

(*) Notice: Subject to any disclaimer, the term of this patent is extended or adjusted under 35 U.S.C. 154(b) by 616 days.

(21) Appl. No.: 17/304,072

(22) Filed: Jun. 14, 2021

(65) Prior Publication Data
US 2021/0365835 A1 Nov. 25, 2021

Related U.S. Application Data

(63) Continuation of application No. 14/660,519, filed on Mar. 17, 2015, now abandoned.
(Continued)

(51) Int. Cl.
*G06N 5/02* (2023.01)
*G06N 20/00* (2019.01)
(Continued)

(52) U.S. Cl.
CPC .............. *G06N 20/00* (2019.01); *G06N 5/02* (2013.01); *H04L 41/142* (2013.01);
(Continued)

(58) Field of Classification Search
CPC ......... G06N 5/02; G06N 20/00; G06F 21/552
See application file for complete search history.

(56) References Cited

U.S. PATENT DOCUMENTS 5,704,017 A 12/1997 Heckerman et al.
5,864,848 A 1/1999 Horvitz et al.
(Continued)

FOREIGN PATENT DOCUMENTS

DE 10114649 10/2002
EP 1515502 3/2005
(Continued)

OTHER PUBLICATIONS

Tylman W. Anomaly-based intrusion detection using Bayesian networks. In2008 Third International Conference on Dependability of Computer Systems DepCoS-RELCOMEX Jun. 26, 2008 (pp. 211-218). IEEE. (Year: 2008).*
(Continued)

*Primary Examiner* — Oluwatosin Alabi
(74) *Attorney, Agent, or Firm* — Trop Pruner & Hu, P.C.

(57) ABSTRACT

Behavioral characteristics of at least a first machine component are monitored. A model that represents machine-to-machine interactions between at least the first machine component and at least a further machine component is generated. Using the monitored behavioral characteristics and the generated model, an incongruity of a behavior of at least the first machine component and the machine-to-machine interactions is computed, where the incongruity is predicted based on determining a discordance between an expectation of the system and the behavior and the machine-to-machine interactions, and wherein the predicting is performed without using a previously built normative rule of behavior and machine-to-machine interactions.

18 Claims, 12 Drawing Sheets

Related U.S. Application Data

(60) Provisional application No. 61/968,444, filed on Mar. 21, 2014.

(51) Int. Cl.
  *H04L 9/40* (2022.01)
  *H04L 41/142* (2022.01)
  *H04L 41/147* (2022.01)
  *G06F 21/55* (2013.01)

(52) U.S. Cl.
  CPC ........ *H04L 41/147* (2013.01); *H04L 63/1425* (2013.01); *G06F 21/552* (2013.01)

(56) References Cited

U.S. PATENT DOCUMENTS

| | | |
|---|---|---|
| 5,999,932 A | 12/1999 | Paul |
| 6,023,700 A | 2/2000 | Owens et al. |
| 6,111,952 A | 8/2000 | Patarin |
| 6,137,526 A | 10/2000 | Kakii |
| 6,161,130 A | 12/2000 | Horvitz et al. |
| 6,400,810 B1 | 6/2002 | Skladman et al. |
| 6,421,709 B1 | 7/2002 | McCormick et al. |
| 6,438,215 B1 | 8/2002 | Skladman et al. |
| 6,480,832 B2 | 11/2002 | Nakisa |
| 6,505,167 B1 | 1/2003 | Horvitz et al. |
| 6,525,676 B2 | 2/2003 | Kisaichi et al. |
| 6,553,358 B1 | 4/2003 | Horvitz |
| 6,615,250 B1 | 9/2003 | Brunet et al. |
| 6,825,781 B2 | 11/2004 | Seyrat et al. |
| 7,085,677 B1 | 8/2006 | Champlin et al. |
| 7,159,042 B1 | 1/2007 | Morvan et al. |
| 7,251,640 B2 | 7/2007 | Baumard |
| 7,352,385 B2 | 4/2008 | Kakii et al. |
| 7,530,105 B2 | 5/2009 | Gilbert |
| 7,562,126 B2 | 7/2009 | Brunet et al. |
| 7,571,152 B2 | 8/2009 | Thienot et al. |
| 7,609,659 B2 | 10/2009 | Hassan et al. |
| 7,711,667 B2 | 5/2010 | Baumard |
| 7,890,996 B1* | 2/2011 | Chauhan ............... H04L 63/029 726/13 |
| 10,594,707 B2* | 3/2020 | El-Moussa .......... H04L 63/1416 |
| 2002/0019870 A1 | 2/2002 | Chirashnya |
| 2002/0116463 A1 | 8/2002 | Hart |
| 2002/0147988 A1 | 10/2002 | Nakano |
| 2002/0159575 A1 | 10/2002 | Skladman et al. |
| 2003/0004621 A1 | 1/2003 | Bousquet |
| 2003/0012348 A1 | 1/2003 | Skladman et al. |
| 2003/0050981 A1 | 3/2003 | Banerjee et al. |
| 2003/0050988 A1 | 3/2003 | Kucherawy |
| 2003/0070003 A1 | 4/2003 | Chong et al. |
| 2004/0015746 A1 | 1/2004 | Christodoulou |
| 2005/0043922 A1 | 2/2005 | Weidl |
| 2005/0058261 A1* | 3/2005 | Baumard ............. G06Q 10/107 379/88.13 |
| 2005/0084082 A1 | 4/2005 | Horvitz et al. |
| 2005/0278178 A1 | 12/2005 | Girouard |
| 2006/0161592 A1* | 7/2006 | Ertoz .................... G06F 21/552 |
| 2010/0094767 A1 | 4/2010 | Miltonberger |
| 2010/0153316 A1 | 6/2010 | Duffield |
| 2011/0197147 A1 | 8/2011 | Anthony |
| 2012/0224057 A1 | 9/2012 | Gill |
| 2012/0240185 A1* | 9/2012 | Kapoor ............... H04L 41/0866 726/1 |
| 2013/0111547 A1 | 5/2013 | Kraemer |
| 2013/0198119 A1* | 8/2013 | Eberhardt, III ........ G06N 20/00 706/12 |
| 2013/0347116 A1 | 12/2013 | Flores |
| 2014/0165140 A1* | 6/2014 | Singla ................. H04L 63/1416 726/1 |
| 2014/0279727 A1* | 9/2014 | Baraniuk ................ G09B 7/00 706/11 |
| 2015/0096026 A1* | 4/2015 | Kolacinski ............... G06N 7/01 726/23 |
| 2015/0161398 A1* | 6/2015 | De Cristofaro ........ G06Q 10/10 726/26 |
| 2015/0163121 A1 | 6/2015 | Mahaffey |
| 2015/0271193 A1* | 9/2015 | Estes .................... H04L 63/1416 726/23 |
| 2016/0028750 A1* | 1/2016 | Di Pietro ............ H04W 12/125 726/23 |

FOREIGN PATENT DOCUMENTS

| | | |
|---|---|---|
| EP | 2922268 B1 | 2/2020 |
| FR | 2830642 | 10/2001 |
| GB | 2366164 | 2/2001 |
| WO | 01/97089 | 6/2001 |
| WO | 2011/063847 A1 | 6/2011 |
| WO | 2013153026 | 10/2013 |

OTHER PUBLICATIONS

Garth LM, Poor HV. Detection of non-Gaussian signals: A paradigm for modern statistical signal processing. Proceedings of the IEEE. Jul. 1994;82(7):1061-95. (Year: 1994).*

Lippmann et al., Recent Advances in Intrusion Detection, 11th International Symposium, RAID 2008, Sep. 2008 (416 pages).

Cheng et al., Comparing Bayesian Network Classifiers, 1999 (8 pages).

Cheung et al., Modeling Multistep Cyber Attacks for Scenario Recognition, In Proceedings of the Third DARPA Information Survivability Conference and Exposition (DISCEX III), Washington, D.C., Apr. 22-24, 2003, vol. I, pp. 284-292.

C.K. Chow, Massachusetts Institute of Technology Project MAC, Artificial Intelligence, Memo. No. 175, On Optimum Recognition Error and Rejection Tradeoff, Apr. 1969 (35 pages).

Cuppens et al., Alert Correlation in a Cooperative Intrusion Detection Framework, Proceedings of the 2002 IEEE Symposium on Security and Privacy, 2002 (14 pages).

Derks et al., NASA-CR-194568, Incongruity, Incongruity Resolution, and Mental States: The Measure and Modification of Situational Awareness and Control, Jul. 1993 (97 pages).

Garfinkel, IEEE Degraded Security, Operations with Degraded Security, 2011 (6 pages).

Hansen et al., The Error-Reject Tradeoff, 1997 (30 pages).

Juels et al., Sherlock Holmes and The Case of the Advanced Persistent Threat, 2012 (4 pages).

Van Lankveld et al., Difficulty Scaling through Incongruity, Proceedings of the Fourth Artificial Intelligence and Interactive Digital Entertainment Conference, 2008 (2 pages).

Tan et al., AutoISES: Automatically Inferring Security Specifications and Detecting Violations, www.usenix.org/legacy/event/sec08/tech/full_papers/tan_1/tan_1_html/ 2008 (11 pages).

Zhao et al., Anomaly Detection with Score functions based on Nearest Neighbor Graphs, Abstract, NIPS Proceedings, 2009 (2 pages).

Markou et al., Novelty detection: a review—part 1: statistical approaches, Signal Processing 2003 (17 pages).

Stephen Marsland, Novelty Detection in Learning Systems, Neural Computing Surveys 3, 2002 (39 pages).

McEachen et al., Aggregating Distributed Sensor Data for Network Intrusion Detection, Proceedings of the 11th IEEE Symposium on Computers and Communications (ISCC'06) 2006 (6 pages).

Modelo-Howard et al., Determining Placement of Intrusion Detectors for a Distributed Application through Bayesian Network Modelin, 2008 (20 pages).

Xinming Ou et al., An Empirical Approach to Modeling Uncertainty in Intrusion Analysis, HP Laboratories HPL-2009-334, 2009 (11 pages).

Rauterberg, Amme: an Automatic Mental Model Evaluation to analyse user behaviour traced in a finite, discrete state space, Ergonomics, 1993 (12 pages).

Rauterberg, About a Framework for Information and Information Processing of Learning Systems, Information System Concepts

(56) References Cited

OTHER PUBLICATIONS

Towards a consolidation of views Proceedings of the IFIP international working conference on information system concepts, 1995 (17 pages).
Sakthiyuvaraja Sakthivelmurugan, An Empirical Approach to Modeling Uncertainty in Intrusion Analysis, Thesis, 2009 (73 pages).
Starbuck et al., Challenger: Fine-Tuning the Odds Until Something Breaks, 1988 (21 pages).
Sterbenz et al., Resilience and survivability in communication networks: Strategies, principles, and survey of disciplines, Mar. 2010 (21 pages).
Slavko Tkalac, The Types of Incongruity and Paulos's Model, UDC: 007.52, Mar. 2000 (9 pages).
Yeung et al., Host-Based Intrusion Detection Using Dynamic and Static Behavioral Models, Nov. 2001 (34 pages).
Zhai et al., Reasoning about Complementary Intrusion Evidence, 2004 (10 pages).
Vaughan-Nichols, "Saving Private E-Mail," XP-002273601, IEEE Spectr. (USA), IEEE Spectrum, vol. 40, No. 8, pp. 40-44 (Aug. 2003).
Graham, "A Plan for Spam," XP-002273602, Internet, pp. 1-8 (Aug. 2002).
Friedman et al., "Bayesian Network Classifiers," Kluwer Academic Publishers, Boston, pp. 1-36 (1997).
Friedman et al., "Bayesian Network Classification with Continuous Attributes: Getting the Best of Both Discretization and Parametric Fitting," pp. 1-36 (1996).
Guo, "A Bayesian Approach for Automatic Algorithm Selection," Dept. of Computing and Information Sciences, Kansas State University, Manhattan, KS, USA, 2003, pp. 1-5.
Jameson et al., "Making Systems Sensitive to the User's Time and Working Memory Constraints," Dept. of Computer Science, University of Saarbrucken, Germany, 1999, pp. 1-8.
Heckerman, A Tutorial on Learning with Bayesian Networks, Microsoft Research Advanced Technology Division, MSR-TR-95-06, Mar. 1995 (3 pages).
Emotional Nonverbal Communication Based on Fuzzy Dynamic Bayesian Network, Hua Zhang; Rui Li; Control, Automation, Robotics and Vision, 2006. ICARCV '06. 9th International Conference on Dec. 5-8, 2006, Digital Object Identifier 10.1109/ICARCV.2006. 345229—Abstract Only (2 pages).
An Emotional Model for Nonverbal Communication Based on Fuzzy Dynamic Bayesian Network, Zhang Hua; Li Rui; • V Sun Jizhou; Electrical and Computer Engineering, 2006. CCECE '06. Canadian Conference on May 2006 Digital Object Identifier 10.1109/CCECE.2006.277439—Abstract Only (2 pages).
European Patent Office, Communication—Extended European Search Report for EP Appl. No. 15000833.2 dated Aug. 19, 2015 (6 pages).
European Patent Office, Summons to attend oral proceedings pursuant to Rule 115(1) EPC for 15000833.2 dated Dec. 12, 2018 (11 pages).
European Patent Office, Communication pursuant to Article 94(3) EPC for Appl. No. 15000833.2 dated Apr. 13, 2018 (5 pages).
Lakhina, "Mining Anomalies Using Traffic Feature Distributions," 2005, ACM 1-59593-009 (12 pages).
An et al., Privacy Intrusion Detection Using Dynamic Bayesian Networks, Aug. 14-16, 2006 (8 pages).
Beran, Rudolf, Minimum Hellinger Distance Estimates for Parametric Models, 1977 (19 pages).
Casella et al., Explaining the Gibbs Sampler, 1992 (16 pages).
Charitos et al., Science Direct, A dynamic Bayesian network for diagnosing ventilator-associated pneumonia in ICU patients, 2007 (10 pages).
Dean et al., A model for reasoning about persistence and causation, 1989 (10 pages).
Gonzales et al., A New Algorithm for Learning Non-Stationary Dynamic Bayesian Networks With Application to Event Detection, 2015 (6 pages).
Hourbracq et al., Real time learning of non-stationary processes with dynamic Bayesian Networks, Jun. 2016 (14 pages).
Grzegorczyk et al., Non-homogeneous dynamic Bayesian networks for continuous data, Feb. 27, 2011 (65 pages).
Grzegorczyk et al., Bioinformatics, Original Paper, Modelling non-stationary gene regulatory processes with a non-homogeneous Bayesian network and the allocation sampler, Jul. 14, 2008 (8 pages).
Kruegel et al., Bayesian Event Classification for Intrusion Detection, 2003 (10 pages).
Lerner et al., Bayesian Fault Detection and Diagnosis in Dynamic Systems, 2000 (7 pages).
Mitra et al., Gesture-based Dynamic Bayesian Network for noise robust speech recognition, May 2011 (5 pages).
Murphy, Kevin Patrick, Dynamic Bayesian Networks: Representation, Inference and Learning, 2002 (225 pages).
Mutz et al., Anomalous System Call Detection, May 22, 2007 (32 pages).
Ourston et al., Applications of Hidden Markov Models to Detecting Multi-stage Network Attacks, 2002 (10 pages).
Pearl, J, Abstract Only, Probabilistic reasoning in intelligent systems: networks of plausible inference 2014 (1 page).
Robinson et al., Non-stationary dynamic Bayesian networks, 2009 (8 pages).
Robinson et al., Journal of Machine Learning Research 11, Learning Non-Stationary Dynamic Bayesian Networks, 2010 (34 pages).
Sicard et al., Expert knowledge integration to model complex food processes. Application on the camembert cheese ripening process, 2011 (9 pages).
Song et al., Time-Varying Dynamic Bayesian Networks, 2009 (9 pages).
Xu et al., Continuous Time Bayesian Networks for Host Level Network Intrusion Detection, 2008 (15 pages).
Xu et al., Intrusion Detection using Continuous Time Bayesian Networks, 2010 (30 pages).
Yeung et al., Intrusion Detection using Continuous Time Bayesian Networks, 2003 (34 pages).
Zanero et al., Abstract Only, Unsupervised learning algorithms for intrusion detection, 2008 (1 page).
Grzegorczyk et al., Non-stationary continuous dynamic Bayesian networks, 2009 (9 pages).

* cited by examiner

Behavioral learning of local and M2M
events for self-congruity and self-incongruity measurements Advanced Persistent Threat Initial Characterization

AUTONOMOUS DETECTION OF INCONGRUOUS BEHAVIORS

CROSS-REFERENCE TO RELATED APPLICATION

This application is a continuation of U.S. application Ser. No. 14/660,519, entitled "AUTONOMOUS DETECTION OF INCONGRUOUS BEHAVIORS," filed Mar. 17, 2015, and claims the benefit under 35 U.S.C. § 119(e) of U.S. Provisional Application No. 61/968,444, entitled "METHOD AND SYSTEM FOR THE AUTONOMOUS DETECTION OF INCONGRUOUS BEHAVIORS PROPONENT TO CYBERSECURITY HAZARDS, THREATS, INTRUSIONS, MALEVOLENT BEHAVIORS AND THE DETECTION OF ADVANCED PERSISTENT THREATS," filed Mar. 21, 2014, which are both hereby incorporated by reference.

BACKGROUND

With the rise of machine-to-machine communications and computer operations, the quest for secure machines and networks has been performed to achieve resilience in computer infrastructures, transport infrastructures and networks, financial investment markets, life support systems, aeronautical and defense systems, and so forth. As the dependence on computers and machine-to-machine interactions of electronic and software components rises, so does the number of malicious and malevolent technical systems and individuals who try to intrude into networks and systems in order to gain unauthorized access, conduct destructive operations, conduct illegal intelligence gathering, or gain or elevate illicit privileges. Detecting, preventing and stopping such behaviors are respectively referred to as computer security and network defense.

Intrusion detection systems (IDS) can provide computer and network defense mechanisms that identify the signatures of aberrant and unauthorized behavior within incoming traffic data. Such systems are based on the detection of anomalies in comparison to known signatures or known normal behaviors and patterns.

BRIEF DESCRIPTION OF THE DRAWINGS

Some implementations of the present disclosure are described with respect to the following figures.

DETAILED DESCRIPTION

Figure 1A:
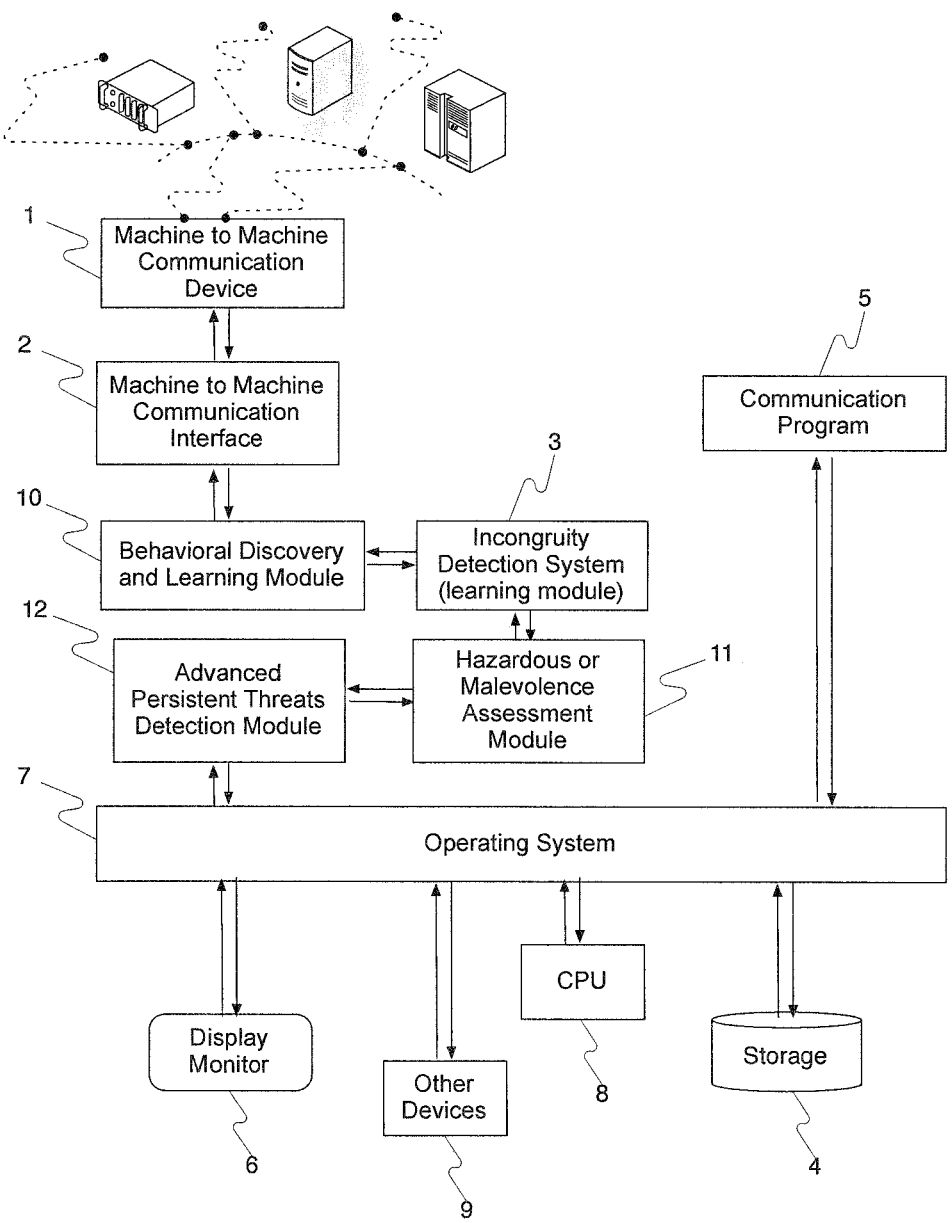
FIG. 1A is an overall view of an example system according to some implementations.

Some implementations of the present disclosure relate generally to the security of computers, computer networks and electronic communications in machine behavior and machine-to-machine interactions, through the automated generation of autonomous situational awareness and capability to detect incongruous behaviors in a machine and/or interacting machines and within the behavior of their components.

Anomalies are deviations or departures from a normal or common order, form, pattern or rule. Anomaly detection includes of identifying significant statistical deviations of a data set from its supposed nominal distribution. Hence, the capacity of detecting anomalies depends on the prior knowledge and prior categorization of known threats, and their known signatures. Nominal distribution, however, is unknown in most typical applications or involve a nominal training data set in order to reliably estimate a normal or common order of test data. The forgoing anomaly detection technique can involve a quest for advancing the discovery and knowledge of known attacks and malicious behaviors, hence creating a competition for the development of detection methods of advanced attack and intrusion mechanisms that can escape the prior knowledge acquired by defense systems and methods.

Accordingly, offending and malicious systems have evolved to avoid pattern and signature recognition, and are referred to as "patternless intrusions," with their correspondent counter-systems referred to as "patternless intrusion detection systems." Such methods and systems attempt to address the rise of advanced and complex attacks, which rely on the combination of techniques allowing attackers to evade detection in order to gain and maintain a persistent access to the compromised network or system to finally conduct a series of operations that can include the retrieval of sensitive information stored electronically. This category of threats is referred to as "Advanced Persistent Threats" (APTs). Motives for APTs vary, and can include the following: access to governmental files, technological and industrial espionage, illicit database retrieval on sensitive, strategic laboratories and monetary funds, tampering with an electronic transaction platform to hide illicit or criminal financial transactions, tampering with strategic research programs, information on operational oil and gas field production, sabotaging competitive developments and political or commercial motives, tampering or compromising industrial control systems, flight recorders, airborne and airplane control systems, unmanned air vehicles, and so forth.

"Patternless Intrusion Detection Systems" (PIDS) rely on neither prior human behavior modeling nor signatures of malicious behaviors in order to detect an anomalous behavior. Yet, they still rely on the detection of deviations or departures from a normal or common order, form, pattern or rule by interpreting a network behavior with a statistical analysis of observable network traffic. PIDS includes graphical use interfaces (GUIs) that allow visualizing a network's overall behavior, and thus, detecting abnormal or anomalous behavior within the network or system. This method depends on human expertise or network administrators with specific knowledge to decide if the observed traffic should be identified as anomalous.

The discovery of an anomaly in machine behavior involves being able to determine if the observed behavior is new to this machine and its operational environment. This task can be referred to as novelty detection. Novelty detection is the identification of a new or unknown data, signal, pattern, signature or behavior that machine learning has not previously learned or acquired either through training or through a discovery mechanism. Thus, novelty detection involves recognizing a signal that differs from previous signals, triggering an unexpected perception. In some examples, a novelty filter can be created by learning a data set that describes normal data, signals, behaviors or signatures. Human beings i.e. users, network administrators, or experts in the concerned field for novelty detection, train these data sets. Once acquired, this training is applied to new signals in order to determine if the incoming data or signal presents unknown characteristics to the novelty filter data set. Such approaches can have a vulnerability referred to as "unknown unknowns": the novelty detection filter is limited to datasets that are known in advance. Patterns, signals or signatures that do not fall in known classes, categorizations or patterns, cannot be determined as "new" or "unknown" to the specific training of the novelty detection filter. Hence, a signal can be "unknown" to a specific training data set, but not new. Inversely, a signal can present characteristics known to the training data set, while offering a combination of data that is new.

Some example approaches are able to circumscribe this "unknown unknown" circularity. Statistical approaches to novelty detection are based on modeling the statistical properties of known normal behavior, signals or signatures, and confronting new data set with a preexisting model of the "known." Such techniques involve computing the density function of a known data class, the statistical distance between known data models and new data, or differences in data characteristics, such as frequency compared to known frequencies, peak behavior compared to known peak behaviors and data neighboring compared to usual neighboring. However, in a real world situation, data, signals or signatures are only not always known or captured in full, and therefore, their underlying distribution, peak behaviors, neighbors and parameters are unknown to the receiving machine, unless taught from external sources with a specific teaching mechanism. In case of lack of prior knowledge, normative approaches fail to recognize if a pattern could be deemed as unknown or known.

Another parametric approach to novelty detection involves calculating the rejection rate of an incoming set of data, assuming that data distributions are Gaussian in nature. This approach is referred to as the "error-rejection trade off" between the data being recognized and the data being rejected. However, such an approach is based on the codification or classification of human confidence in the rules that are used for classifying the data. Hence, this approach does not solve the "unknown unknown" obstacle, and may, on the contrary, increase the rate of false negatives as it involves, in some situations, dropping estimates based on a posteriori probabilities.

Another set of example approaches to detect novelty use probabilistic and Bayesian techniques. They are referred to as Gaussian Mixture Modeling (GMM). These approaches include maximizing the log likelihood of the training data with optimization algorithms. The method includes of building a heuristic model in order to minimize the number of thresholds in the novelty detection system. Such techniques are appropriate when a very large number of events are accessible to train and refine the model. The approach includes building a large statistical model of normality, and testing, then refining the heuristics of discovery against this model. This approach is well adapted to "knowable unknowns," i.e. to discover unexpected variations or evolutions of data in a data set with a prior knowledge of its usual patterns of behaviors, and has been successfully used in the domains of medicine diagnostic, jet engine fault detection or similar domains with important flows of statistical data over a known and comparable population of events.

The probabilistic discovery of novelty can be used in computer intrusions detection in an approach referred to as Hidden Markov Models (HMM). The approach includes teaching a system with a finite number of states that are not observable by the system. The transition between one state to another is considered a stochastic process. The method calculates the probability of transition for each state, and compares it to the modeling of normal system behavior. For instance, system call sequences and shell command sequences can be modeled into a hidden normal behavior and an expectation-maximization (EM) algorithm can be used to detect a novel behavior in the data set. Such an approach compares the probability distribution of a normal system over time with the frequency distribution of incoming behaviors. However, modeling data distributions in advance, and then estimating the probability of a deviation from the known probabilities of distribution of these behaviors drives typical methods. Such methods do not achieve an autonomous learning of novelty detection, as novelty criteria have to be discovered before applying the novelty detection model. Such methods are efficient for the recognition of known symptoms within large data sets, for instance when an important class of symptom is under-represented in a data set. Hence, example novelty detectors may rely on previously taught data, signals or behaviors that are inconsistent with the remainder of the known dataset, and thus, are incapable of detecting novelty without the existence of a prior model of "normal" data, signals or behaviors. In particular, such methods have difficulties handling "unrepresentative data," i.e. data that fails to display characteristics that would allow attributing them a typical deviation from normal behavior. Generally, when confronted with such "unrepresentative data," some novelty detection approaches simply ignore them, which is a problem referred as outlier detection. Some anomaly detection approaches can stumble on this obstacle, failing to produce a satisfying answer with methods based on nominal distributions and prior normative learning.

Sigmund Freud conducted one of the first studies of a discovery mechanism dealing with "unrepresentative data." Freud suggested that humor is derived from the release of an unconscious—suppressed of forbade—content, by an utter incongruity that brings it to consciousness. In this perspective, the receiver is not aware of these unconscious processes, yet the receiver builds a framework of interrelations that have their own intrinsic harmony. "Incongruous" information, in this definition, is a combination of data that is not in agreement or dramatically lacks harmony with the internal and unaware logic of the receiver. In Freud's perspective, the "unaware state" of this internal logic is not automatic, but maintained by suppression or self-deceit mechanisms, which are part of inhibition. Hence, to self-reveal this unconscious relation presents a psychological expenditure for the bearer. For Freud, the pleasure in jokes "arises from an economy in expenditure upon inhibition."

Thus, an incongruity can arise without the presence of a prior and explicitly agreed normal order of information between an emitting and a receiving party. The incongruity is produced by the incompatibility between an internal logic and signals that are inconsistent with this internal logic. This method of measuring discordance is advantageous over "anomaly detection" methods, which involve the measurement of deviation from a known or normal order, pattern or organization of behavior and data. Incongruous data, stimulus, events or behaviors are data, stimuli, events or behaviors that are not in accord with the specific expectation derived from the internally "learned" logic of the receiver. In other words, an expectation of the system is based on learned endogenous logic of the system, where the learned endogenous logic learned from previous operations of the system. The system can be learned without using any external knowledge.

Incongruity can be described as the difference between internal complexity of a learning system and external complexity of the context. However, such a definition does not encompass the possibility of "self-incongruity," that is to say the state of incongruity of a system, a reasoning model, and a "worldview" without the need to confront it with other systems, models or worldviews. Freud's perspective separating the implicit (unconscious) habitual mental picture compared to the explicit (revealed or self-revealed) presents the advantage of integrating an autonomous perspective in incongruity detection. In particular, Freud's perspective offers the advantage of exploring the discovery of an internal incongruity by the system producing or carrying this incongruity itself. Another definition of incongruity that is more compatible with Freud's original perspective involves defining it as "the simultaneous presence of two or more habitually incompatible elements, where an element can be either an object or an event." Hence, an incongruity can be derived or discovered by the introduction of a new element (novelty), or simply, by the discovery of an unsuspected relation between elements that were already known (self-revelation). Dissonance can be the result of a confrontation between an internal expectation and information coming from the external environment, as much as a discordance between internal relations between events that suddenly come to the awareness of perceiver or perceiving system.

Figure 3:
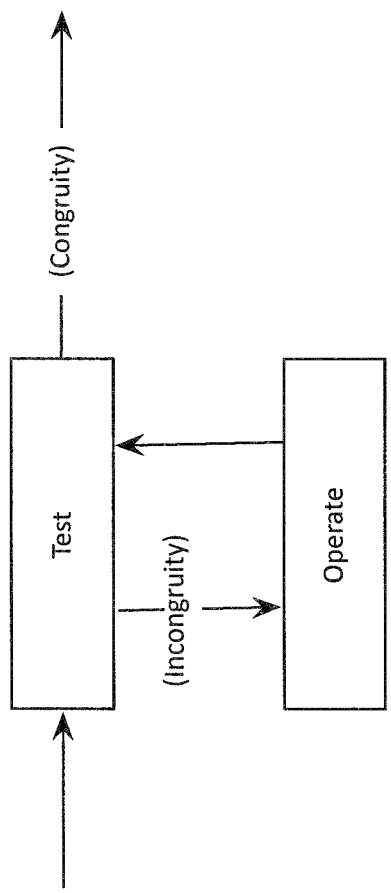
FIG. 3 is a diagram representing a Test-Operate-Test-Exit (TOTE) model according to some examples.

In some examples, incongruity can be applied in cybernetics. The response of an effector to an event depends on testing, then re-testing operational procedures while watching how these iterations modify the outcome of the test. The action is initiated by an incongruity between the state of the organism and the state that is being tested for, and the action persists until the incongruity (i.e. the proximal stimulus) is removed. This initial model can be referred to as "cybernetic hypothesis." FIG. 3 depicts a Test-Operate-Test-Exit (TOTE) unit. This model is an attempt of modeling a mediating organization of experience between a stimulus and a response. The TOTE approach is an algorithm for solving non-deterministic problems within a complex design, following the tasks of testing in order to obtain a representation of the problem, operating to create a change that can be characterized, testing again in order to observe the outcome behavior, and exiting when the problem is solved.

In other examples, incongruity resolution is not systematically followed by a negative reaction or a surprise, but can also be followed by reality assimilation. The discovery of an incongruity can serve the purpose of explaining and learning a new relation between two concepts or events, while assuming and accepting that they are incongruent. This suggestion provides a cue for modeling the tasks followed by the discoverer of an incongruous behavior, event or stimulus. In other examples, an incongruity perceived for the first time will trigger an attempt to explain its possibility, trying to find rationales to make it more congruous to what the perceiver previously learned. Instead of reacting negatively or by rejection, perceivers try to solve the problem, utilizing what they learned in the past about the relations between the incongruous display of events to try to make sense of them. In such examples, incongruity can serve as a trigger for sense-making and curiosity.

In further examples, incongruity theory is used to measure the situational awareness of pilots, which can be defined as a pilot's internal model of the word around him at any point in time. In this perspective, knowledge on how events interrelated in the past, compared to the present and extrapolations into the future are identified as key component of situational awareness.

In the field of intelligence and threats deterrence, example mechanisms of incongruity detection and production may be used to deceive opponents, or to detect potential deceptions from malevolent opponents. Incongruity can occur when there is a mismatch or discordance between an expected organization or order of signals, and the internal logic of the receiver, but this internal consistency or logic of the receiver cannot be measured, guessed or approximated from a known and objective outside order. Consistency and consonance can be constructs that individuals and organizations build over time through their personal and specific experiences. Therefore, in some examples, an objective of the intelligence work is to discover the specific and idiosyncratic logic of the receiver, in order to anticipate what the target receiver might conceive as congruous or incongruous with his or her own logic of perception.

In some examples, a distinction can be made between genuine incongruity and "contrived incongruity." In some examples, a variant of incongruity can be one where a genuine incongruity arises which is promptly discounted by the victim because he is already expecting an incongruity to turn up. This proposition introduces the idea of an autonomous construct of relative incongruity and congruity expectations in receiving or emitting entities, such as humans or organizations. Furthermore, in some examples, a transitive processing rule can be provided in the handling of congruities and incongruities. When an incongruity is expected, and an incongruity is delivered, the interaction between two entities may be deemed congruous, as expectation is matched with the received data, signal or behavior. Therefore, a congruity can be unexpected if the receiving organization, individual or unit is expecting a high level of incongruity from its interacting party.

In some examples, incongruities may thus be neither objective, nor detected from statistical deviations or departures from a priori known normal or common order, form, pattern or rule. Each unit, human being, organization constructs its own set of expected rules and relations between events, and the latter can only be known through interacting with the potential entities that will receive a congruous or incongruous signal. Whether a receiver will consider an event or signal, as "incongruous" will therefore depend on of the "mental picture" he or she holds about the emitter of such a signal or event. However, this "picture," "belief" or "representation" is constructed through interacting with the emitter, and there dynamically evolves over time. People measure incongruity relatively to what they have learned about their interlocutors' behaviors, and judge new behaviors relatively to the past knowledge they accumulated through interactions. Evaluating incongruity hence depends both on the knowledge of the interlocutor, self-knowledge (knowledge of own behavior), and evaluating if a new interaction is harmonious or disharmonious, consistent or inconsistent, in consonance or in dissonance, with previous interactions.

The notions of preparation and induction can be used for producing unnoticed incongruities before they become apparent. In some examples, incongruities are detected according to their relative dissonance with the "congruity versus incongruity" expectations of the victim; there is therefore a method to diminish the relative incongruity weight of an event by adjusting its perceived incongruous value over time. In other words, if an incongruity is introduced slowly over time by small steps presenting a low relative incongruity value, there is a probability that this incongruity will not be considered intolerable at each step, while growing unnoticed in the perception framework of the victim. Preparation is a method including designing and crafting signals or behaviors so that they contrive a higher relative congruity value that their intrinsic incongruous value to the receiver. Repeated over time, the method allows for the relative weight of incongruity to be discarded in regard of the more important relative weight of congruity. Induction is an approach that includes inducing in the victim's reasoning model an acceptance and tolerance for the incongruity that will be later presented to the victim. These techniques can be referred to in the field of cybersecurity as "social engineering" and are used to gain, in this field of application, access to a computer or network system, obtain passwords, or conduct identity theft. Counterfeiters may use similar techniques. The field of the counterfeiter includes diminishing the potentially perceived incongruities by art experts by making the existence of the counterfeited art slowly and progressively accepted by the victim. For example, a counterfeiter, using this method of preparation and induction of the victim, can authenticate a counterfeited painting. This can be referred to as acclimatization by slow change by progressively introducing at each step a relatively congruous false presentation of evidence, or slowly inducing a greater tolerance for a repeated and persistent small incongruities.

The rationale behind the success of preparation and induction resides in a typical human cognitive bias. When a small incongruity is tolerated or ignored, individuals tend to discard the event, which they will either forget or put aside as non-significant. When presented at a later time with same low-intensity incongruity, its relative weight in perception will again be considered as a weak signal of little importance, and they will further increase the tolerance to the incoming low-intensity incongruity, and rise their level of acceptance of risk accordingly. Over time, a persistent incongruity with the same low-intensity will be progressively perceived as innocuous, even when a statistical appreciation of the underlying risk would demonstrate that this risk has not decreased. This phenomenon can be referred to as "fine tuning the odds." The tolerance towards low-intensity incongruities is also exploited in computer attacks. Attacks exploiting this vulnerability of human cognition can be referred to as "marginal attacks," or "low intensity attacks," which can escape the vigilance of supervised intrusion detection systems. Such attacks are examples of malevolent behaviors referred to as Advanced Persistent Threats (APTs). In a computer attack context, the low-intensity incongruous behavior would display a false evidence of a known signature, hence escaping detection from knowledge-based detection algorithms that look for known signatures of attack. Concordantly, a low-intensity attack adopts a contrived behavior that does not represent a significant statistical change in the data sets controlled for behavioral change by behavior-based detection systems. The deviation or departure from a statistical normal or common order, form, pattern or rule would hence not present a statistical significance, and escape, again, detection from behavior-based detection algorithms that analyze the overall behavior of an entity and look for differences between a past behavior and the current behavior. Hence, the detection of low-intensity incongruity, such as marginal attacks or low-intensity attacks, does not benefit from a satisfying method for their detection, deterrence and identification.

There is the possibility of the emitting system being vulnerable of its own incongruities while building behavior expectations of the receiver. Persistent incongruities can also reside in a system's own behavior, and likewise, become unnoticed, acclimated or forgotten. Therefore, the design of a valid incongruity detection system should encompass the influence of endogenous incongruity generation, and endogenous detection of persistent incongruities, as to avoid their potential contamination of expectations. A system's endogenous incongruity can "loop back" into the construction of expectations, and lower the awareness of a system to these endogenously tolerated incongruities. Thus, in order to achieve a satisfying performance, an incongruity detection system should be able to detect its own behavior inconsistencies, incongruities or dissonances. Moreover, all cognitions do not benefit from previous occurrences. Information can be unexpected and completely unknown: a situation referred to as "the singularity of the first time." This singularity of the first time could also occur as a system discovers its own and endogenous incongruity into its functioning and behavioral model. A previously unsuspected relation between events that were already learned from, for example, actions of auditing or inspecting its own local events, could lead a system to discover "for the first time" that it is carrying illogical and inconsistent behavior. This discovery could occur when a system is performing an audit, and accessing a local event, a routine, a program, a software component, that was residing endogenously, but was never operated before. This may be integrated in an incongruity detection system for forensic analysis purposes, or to search, for example, for a "dormant" threat, such as Advanced Persistent Threats (APTs). Hence, developing an incongruity detection system for machine-to-machine interactions may involve the construction of a learning module that calculates these congruity and incongruities values of the local and/or internal behavior of each machine, node or component. Such measurements can be referred to as "self-congruity" and "self-incongruity." Self-congruity is the extent to which a new endogenous and local behavior is congruous with previous behavior of the same machine. Self-incongruity is the extent to which a new endogenous behavior is incongruous with previous behaviors of the same machine or component. In case of new interaction, and thereof in the absence of previous interactions to judge the congruity or incongruity of received events or signals, a system might compare this behavior with other behaviors it has learned in other interactions. As the new interaction grows over time, then the system would construct a mental model by increasing its knowledge of this new behavior. Likewise, in case of a new local event or endogenous component behavior, the incongruity detection system should be able to compare this unexpected behavior to a probability range of other behaviors of local events that it has learned in the past.

In some examples, deception and counter-deception operations may tend to fail when they were based on external assumptions of what the adversaries would consider as "normal." Projecting a normal behavior was not sufficient, and approximations about target's behavior may fail to grasp the belief structure of adversaries. Thus, in some examples, congruity and incongruity may be concepts that are based on the relative expectations of the receivers and the emitters. For example, when a target expects a strong intensity of incongruity (for example, entering an unknown territory), broadcasting excessively congruous signals would lead to the detection of the decoy. People measure incongruity relatively to what they have learned to appreciate as harmonious or disharmonious, consistent or inconsistent. But inconsistencies are internal values. They cannot be measured against an "objective" and "external" normal consistency. Truths, in some examples, may be eminently local, built from within and unique to each point of reception of signals.

In some examples, the goal of any decoy task is to penetrate the internal logic of the target, i.e. trying to understand what combination of events, or signals, will be considered as congruous or harmonious, and what combinations of events could seem incongruous to the target. This may imply that for each target, a very precise model of the "target" behavior would be built.

In some examples, intelligence can be used to understand how targets would consider events congruous or incongruous was through intelligence. Field agents may observe target behaviors, and note every single instance of their reaction. For example, they may observe how enemies would communicate secret codes (in what context, what officers, what language, the numbers of people involved, their hierarchies, communication channels, nature of intermediaries, etc.), and then, they may construct a behavior for field agents that would imitate this behavior in order to make its perception congruous to targets. Doing so, it may be difficult to understand how targets handle incongruities, and what would be their tolerance for incongruous events. In some examples, if an operation is conducted with zero incongruities, it may immediately raise the suspicion of the target.

In other examples, field or signals intelligence may be used to produce field reports, which may in turn be analyzed by intelligence analysts under textual or visual forms (radar reports, aerial photography, spy reports, etc.). The identification of targets' beliefs, belief structures, expectations for congruence, and expectations for incongruity (for example, entering an enemy territory) may be a matter of intuitively deducting or guessing how the enemy would react to different scenarios, and adjusting (contriving) the level of expected or unexpected incongruities accordingly. According to the previous knowledge of the target's behavior, intelligence analysts, may build a scenario including what they themselves believe as not too incongruous, or not too congruous, and then implement the decoy or deception operation, hoping for a positive result. However, this approach does not involve use of a model that represents the belief structure of targets or receivers of contrived signals.

The representation of belief structures can be used in artificial intelligence using Bayesian Networks (BNs). BNs are graphical representations of the probabilistic relationships among random variables. In some examples, a Bayesian learning module can be used for learning and predicting the probabilistic relationships between incoming and outgoing signals exchanged between several interlocutors. Advantageously, a system using a Bayesian learning module can allow an emitter of a combination of signals to predict the level of interest for those signals by a potential receiver, and vice versa, to determine the probability of the level of interest of an incoming signal. An algorithm for evaluating the congruity or the incongruity of emitted or received signals can be based on the probabilistic relative frequency of data with no previous occurrence in previously learned interactions. This method allows learning over time, without prior teaching, and without the use of an external normal distribution of data or teaching, to measure the dynamic intensity of signals' incongruity, and its behavioral evolution over time.

This method could also allow detecting the deliberate and contrived nature of persistent incongruities, which may be used in the preparation, induction and conduct of sophisticated intrusion scenarios such as Advanced Persistent Threats (APTs). Hence, some example systems and methods allow measuring the evolution of incongruity indexes and intensity at each node level, as a relative probabilistic value of the incongruity and congruities learned from other nodes, within one network of interrelations, or between an emitter and a receiver. Thus, algorithms may be advantageously applied to the generation of cyber-security Bayesian learning module that can successfully detect and deter such security threats.

The main technical challenge of advanced persistent threats resides in detecting the presence and a malicious, hazardous or malevolent activity, even after their first intrusion was successful and undetected, which is a state of a system or network referred to as "compromised." However, knowledge-based and behavior-based intrusion detection systems are not designed to support ongoing operations after a system has been compromised. The objective of such methods is to grant a machine or a user with a permission, which covers a range of legitimate and authorized behaviors. As such methods rely on prior knowledge, deviations or departures from normal behaviors, once the permission is obtained, the intruding software or attacker can legitimately engage in unsuspected activities, such as granting itself other permissions, given they are in the range of approved behaviors by the signature-based or behavior-based detection system. Such vulnerability can lead to creating overall resilience threat as they create environments with persistent degraded security that can be exploited by the attackers. Furthermore, as "dormant" or undetected Advanced Persistent Threat propagated within a target network or system, the overall vulnerability of the network or system increases in unknown proportions.

Advanced Persistent Threats can follow tasks for intrusion and operation. These tasks can resemble field agents gathering intelligence and intruding targets' organizations. They unfold as follows: In a first task, the attacker conducts a reconnaissance exploration. This exploration aims at identifying the defense and network configurations of the targeted network or system. This first task, in some examples, may correspond to the period during which the emitter of a decoy or deception builds a fact sheet of the target's expectations of congruous and incongruous behaviors. In particular, in the field of computer attacks, perpetrators would try to identify the shape of the targeted network or system, its port of entries, its protocols, its certification and signature processes, its known and reputable users, its revision and back-up routines, in order to determine the method of entry that would be the most probable to avoid detection. In a second task, the attacker intrudes the targeted system through a communication device or a communication agent delivery, achieving to be unnoticed. When intrusion is successful, the targeted system is referred to as "compromised." In a third task, the software agent of the attacker, now resident in the targeted host system, collects data and information about the expectations of the system regarding legitimate, authentic and authorized operations (making itself congruent to system expectations). This data, contrary to traditional attacks, is not communicated outside of the host target system, as to preventing detection and maintaining the intruder unnoticed by behavior-based detection systems. This third task is used as to locally, from within the targeted host system, create false evidence of genuine signatures, certificates that might be used by knowledge-based detection systems. In a fourth task, the propagation and activation of the intruded software is triggered autonomously, through different techniques that can include a previously set timer, an event-based triggering routine, or a simple random algorithm (reducing the detection of an internal incongruous behavior). Optionally, in a fifth task, the intruded software agent can trigger a synchronization and outbound communication routine, as to inform the attack perpetrator of the success of the operation, collect and gather sensitive information, collect and reveal to the attacker critical vulnerabilities of target, etc.

The objective of Advanced Persistent Threats (APTs) attacks is hence to compromise a networked or local system without being detected, in order to achieve partial or total ownership of its command and control. Once this partial ownership is achieved, an APT can autonomously take control of targeted network resources, upload codes and programs, implement false evidence, access sensitive data, implement dormant software for delayed or autonomously triggered malicious attacks, and, finally escape the host system without having been detected.

To avoid detection, Advanced Persistent Threats can use combination of several techniques in order to change their behavior at each task of their programmed behavior. This behavior of Advanced Persistent Threats is referred as "morphing" or "situational adaptation," which includes changing the behavior of an attack while this attack is deploying. The first task, which includes the attacker's learning about the network or system defense, is useful for the success of APT attacks, as reconnaissance operation allows preparing to later morph itself "on the fly" in order to bypass both normative behavior-based and knowledge-based (signatures) detection systems. APTs that proceed to retrieve sensitive data and send them back to the attacker should, furthermore, to be able to exit the targeted network or system undetected.

Several example techniques can be applied to prevent such morphing. A method could include modifying the predicaments and configurations of the targeted networks, hosts and applications continually, following a pattern of modification that is unpredictable and undetectable by the APT attacker. Such a dynamic modification may be intended to confuse attackers, and to dynamically change the configuration of the compromised network so that automatic triggers of APTs would fail to operate properly would be eventually delayed or detected. The rationale between these methods lies in the delay between the reconnaissance task, and the actual attack task, that the attackers would use to prepare and induce the targeted network or system. However, this method may not allow detecting an incongruous or malevolent behavior. The method may dynamically change the targeted environment intruded by the attacker, hoping that such a disturbance would impede the attack's success, without knowing the shape of this attack, and without being able to locate where the attack is actually taking place. Moreover, such a method may be impractical and may not trigger successful outcomes when a network or system has already been compromised, as the APT intruder would already benefit from approved signatures, authorizations and security level permits, that it would eventually uses to dynamically adapt to the morphing of the network or system. Even in the case of dynamic address or port hopping, that is to say dynamically changing the addresses used by a protocol or a program, an APT intruder that has already compromised the targeted network may be able to learn from inside the dynamic hopping, and may, therefore, further increasing its penetration in the network. Furthermore, when an APT attack is in its final phase of exiting the system with retrieved confidential and sensitive data, it is likely going to use legitimate port of communications, and/or legitimate protocols to achieve its external communication. Yet, legitimate users of the targeted network should be able to use these outbound communication ports for their daily use. Therefore, the constant and dynamic morphing of the targeted network will make sure that these legitimate outbound communication channels are always available, and hence could be used by an exiting APT.

Hence, detecting and preventing Advanced Persistent Threats involves detecting an incongruous behavior of a machine or network component inbound (as the attacker's software intrudes the system), and outbound (when the attacker's software leaves the system). Advantageously, in some examples, a method allows predicting incongruous signal behavior for both outgoing and incoming communications, and allowing for tracking such behaviors as inter-related to the same emitter or the same receiver. Therefore, adversarial reconnaissance can be operated in the preparation phase (first task of APT), as well as during the other phases (tasks two to five) of an APT, and during its exiting behavior. Measuring the "self-congruity" or "self-incongruity" of a network or system behavior would advantageously allow detecting and measuring an incongruous behavior, whether or not the network or system environment is morphing. The use of relative behavioral modeling, that is to say modeling on the fly the behavior of software, components, data and events relatively to previous behaviors and previous interactions, allows to focus on the detection of inter-related behavioral changes of machines and components through the calculation of relative values. The use of relative frequencies of modification, instead of comparison with normative and fixed values, allows following the transformation of a targeted behavior, before, during and after an interaction. Advantageously, this method allows to adaptively learning and integrates the overall dynamic change of a target environment.

A successful detection of an Advanced Persistent Threat behavior thus involves being able to detect and measure the incongruity of an external event (a machine-to-machine communication, a network event, for example), and simultaneously and relatively, estimating the "self-congruity" or "self-incongruity" of the targeted system of machine itself. Successful detection accordingly involve both the ability to develop a situational awareness of incoming events, and a self-awareness of changes taking place in the local behavior of the host or potentially threatened machine or node. The combination of these two learning modules would ensure to predict outcomes before they occur, by anticipating the expected behavior towards a previously learned incongruous behavior, either from a machine-to-machine interaction, or at locally and endogenously to a specific node.

If Advanced Persistent Threats follow established tasks of reconnaissance, infiltration, legitimating, executing and exiting, they can encompass, as a class of behavior; and many different stratagems exist, with the use of a large variety of techniques at each task. In some examples, the versatility and the important range of behaviors and tactics involved in APTs would be more appropriately described as "campaigns" than as "programs." This versatility makes APT's class of attack behaviors difficult to identify or declare as such, as some of these tactics may not involve any illegitimate techniques. For example, an APT conducted by a legitimate insider may use several authorized behaviors, bearing signatures, and granted access, given that the perpetrator is, from the start, an identified and accredited user of the system. This property of APTs constitutes a challenge as their behaviors cannot be related to a specific prior knowledge, a specific component usage, a specific address or port hopping, a specific signature, etc. The challenge can be stated as follows: to use a combination of hunches, guessing, intuition, code-level tools, exploratory testing, signals detection instruments, to build judgments about a potential intrusion and a potential stratagem of attackers, leading, eventually, to the discovery of an Advanced Persistent Threat. Scenario recognition can thus be a difficult challenge to solve.

The automation and the autonomy of a learning module that would support the detection of intrusions is hence a recurrent challenge. In some examples, automation may not involve autonomous learning and autonomy may not involve automated learning. Behavior-based intrusion detection systems can automate their analysis of a behavior, and search for differences with "healthy behaviors." But the knowledge of "healthy behaviors" may involve what is taught to the behavior-based detection algorithm beforehand. When no prior teaching is used, such behavior-based detection systems may rely on the comparison of data with nominal distributions, Gaussian distributions, normal outlier behavior, which are statistical models of normal behaviors, or try building correlations between disparate alerts to recognize a known pattern. Knowledge-based detection systems, which search for known and legitimate signatures of attacks into monitored events, can also be automated, but automation may concern the automatic triggering of comparison with prior knowledge of signatures, which the learning module may have to receive from an external and prior teaching. Such an approach, even when automated, may involve regularly updating and distributing a previously acquired knowledge base, while suffering from the inability to detect unknown attacks. Both knowledge-based and behavior-based typically involve creating a centralized database and updating it.

In some examples, Bayesian networks can be used in the context of security analysis. Some example approaches use available data, such as logs, intrusion detection systems (IDS) alerts, system monitoring outputs, to build probabilistic confidence indexes and correlations about possible evidences of an intrusion. Some example approaches stumble on creating an overall conditional probability table for each node that would accurately capture the overwhelming traffic of data that have to be processed to search for known signatures or known behaviors. Advantageously, in other examples, a Bayesian learning module can be used to distribute the learning at each node, so that each node learns what it sees from its own point of view and stores it locally. Furthermore, the distribution of learning at each node makes it difficult for an intruder to assess the overall security flaws of a system or network, as each node possesses its own security behavior, and the overall security behavior being the result of interaction between all nodes acting independently, whilst interrelated, with other nodes. Advantageously, the Bayesian learning method and system according to some examples allow for a security application to identify a sub-ensemble of nodes (a sub-reasoning network) that can be tested in a local loop, without having to extract the complete reasoning model, and without having to engage in a perilous outgoing communication towards a central point.

Other examples may attempt to simulate the human reasoning of a network administrator into a Bayesian reasoning system by measuring semantic gaps between data, such as in differences observed in the packet pattern of data or signatures. The objective may be to create a framework where a system administrator can feed in these beliefs of certainty and see what consequences arise. Such examples can build a Bayesian network to learn the evolving interrelations of low-level network observations that are captured in a simple logical language augmented with certainty tags. The Bayesian network is used to create a reasoning process, which enables to combine multiple sources of system monitoring data and extract attack traces from the numerous possible interpretations of low-level observations. However, observations used in this method are events that have already been produced by Intrusion Detection Systems, such as IDS alerts, system logs, internal incident reports, which allows the system to operate a proof strengthening, but still depends on the prior availability of security breach evidences. Hence, a rule has to be matched to previously learned configurations (rule database), in order to send the packet logging analysis module. Such a method still relies on previously teaching the Bayesian learning engine about signatures or behaviors, which have been learned elsewhere. Furthermore, the method is not producing a representation or a model of the behavior of the attack, but solely a reasoning model for analyzing traces of a potentially malevolent behavior as identified by their signatures.

In accordance with some embodiments of the present disclosure, processes and/or systems are provided for the autonomous, unsupervised and automated detection of incongruous behaviors in the domain of securing and controlling machine-to-machine electronic interactions.

An example system presented in FIG. 1A includes a central processing unit (CPU) 7 (which can include one or multiple processors), a display monitor 6, a fixed or removable storage 4, a machine-to-machine communication interface 2 and other devices 9 like a keyboard, a pointing device, a printer, or the like. The system of FIG. 1A can be implemented as a single computer or as multiple computers.

It is to be understood that the display monitor is not limited to a simple screen for displaying data, texts and pictures but can include also speakers to play sounds like voice, terminals to display radar signals or spatial coordinates, screens that display financial and critical information, such as an electronic trading platform, health or tele-health monitoring platform and networked command-and-control systems and devices, etc.

The machine-to-machine communication interface 2 can include a card or circuit, or a network component, for transmitting and receiving signals or messages to and from distant communication devices 1 like other network components, computers, phones, personal assistants or the like. The machine-to-machine communication interface 2 can employ protocols for communications on various networks, such as a wide area network, a local area network, a phone network, a radio access network, a wireless network, or any other network, to deliver data flows from the received signals into the system and to transmit signals from data flows produced by the system to the distant machine-to-machine communication devices 1.

A Behavior Discovery and Learning Module 10 is a component and its machine-readable instructions (e.g. software) that receive data or signals from the machine-to-machine communication interface 2, process these data or signals, and then communicate them to an Incongruity Detection System 3.

The Incongruity Detection System 3 is a component and its computer machine-readable instructions, that receive data or signals from the Behavioral Discovery and Learning Module 10, process them according to techniques according to some implementations, and then transmit results to a Hazardous or Malevolence Assessment Module 11.

The Hazardous or Malevolence Assessment Module 11 is a component and its machine-readable instructions, that receive data or signals from the Incongruity Detection System 3, process them according to the method according to some implementations, and then transmit results to an Advanced Persistent Threat Detection Module 12.

Although various modules are described as being implemented by a component and machine-readable instructions, it is noted that the various modules can be implemented with just hardware components in other examples. Also, although reference is made to "module" in the singular sense, it is noted that "module" can also cover multiple modules.

The system further includes an operating system 7 for managing interactions between the CPU 8, the communication interface 2, the storage 4, the display monitor 6 and the other devices 9.

The system further includes a communication program 5 (e.g. email application or web browser application) for processing the interactions managed by the operating system 7. When activating the communication program 5 by the other devices 9, a user of the system can display on the display monitor 6, texts, data, signals, pictures or sounds produced by the communication program 5 from data flows delivered by the communication interface 2 and can send to distant communication devices 1, data, signals, texts, pictures or sounds converted by the communication program 5 into data flows that are transmitted by the communication interface 2.

According to some implementations, the modules 10, 3, 11, and 12 are Bayesian learning modules. These Bayesian learning modules can reside in the operating system 7, and/or in the machine-to-machine communication interface 2, and/or as applications separate from the operating system 7. Each module can include machine-readable instructions for generating Bayesian networks from incoming and outgoing data, captured from the communication interface 2 or gathered from the communication program 5, e.g. a network event, a local event, a data transmission, etc.; databases stored in the fixed or removable storage 4, which can already belong the communication system, such as in a computer, or which can be independent from this communication system (such as in a removable memory card or a network component); a component, which establishes the dialog and exchange of elements of data between the communication program 5 and the Bayesian learning modules 10, 3, 12 and 11.

Other machine-to-machine communication devices 1, such as network switches, Transmission Control Protocol/Internet Protocol (TCP/IP) components, are able to send elements of data (such as packets of data) to the communication system, and may include also or not, elements 2 to 9. Likewise, the communication system according to some implementations is able to send elements of data and/or messages to external or other communication devices 1.

The Bayesian Behavioral Discovery and Learning Module 10 captures flows of data as they come in and out of the communication system, by gathering them into the communication interface 2 or by importing them in real time, or asynchronously, from the communication program 5. This process of capturing data flow from machine-to-machine communication interface is unsupervised, and does not require a human operator to teach or transmit the captured data to the learning modules. The modules 10, 3, 11 and 12 are directly learning from the incoming and outgoing data without the assistance of a user.

When two or several machines interact through the machine-to-machine communication device, incoming data are captured by the machine communication interface 2 and transmitted for analysis to the Bayesian learning modules 10, 3, 12 and 11, before the interaction is fully authorized between the interacting machines. This fully automated process is seamless, unsupervised, and synchronous to machine-to-machine interactions. Likewise, local or system events that take place in the operating system 7, are captured, learned and sent to learning modules 10, 3, 11, 12 automatically and seamlessly while the operating system 7 is conducting its tasks and operations.

When a machine is solicited for an operation or task, either local or machine-to-machine, the communication program 5 and the Bayesian learning modules 10, 3, 12, 11 automatically start to observe its behavior, including the data being sent or received. The Bayesian learning modules generate models of the observed machines, nodes or components' behaviors (10), produce scores concerning its congruity or incongruity relatively of previously, and autonomously, learned behaviors (3), assess the hazardous or malevolent characteristics of the extracted and modeled behaviors (11), and, if the latter is positive, proceed the Advanced Persistent Threat detection system (12) in order to identity a potential advanced persistent threat and alert both the system and, optionally, its human users (12) by displaying these scores of the user's screen 6.

The task of displaying scores on an external display monitor 6 can be omitted in some examples. As the system autonomously detects and learns incongruous behaviors (with modules 10, 3), autonomously assesses, without prior teaching or external normative data, the potential malevolence or hazard within these machine behaviors (with module 11), and autonomously assesses the potentiality of an advanced persistent threat (with module 12), external communications of scores, or external communication with administrators or users (with communication program 5 or display monitor 6), does not have to be performed for the system to continue its operation. This configuration can be used on systems that can lose their access and should continue their operation, for systems sent in situations or locations where all data links and communications have been lost, and/or for robotic applications when a system is designed to accomplish task autonomously.

The display (using the display monitor 6) of scores and results is used when the system and method are used for cybersecurity applications, i.e. when a user or administrator has to watch, audit and/or conduct forensic analysis on a machine or on machine-to-machine interactions.

This display of the scoring can be integrated to the communication program 5, when the local user is trusted to access such information; or scores can be displayed separately, either on screen 6 or with the use of a secure communication through communication program 4, to a distant display at another location for distant monitoring. An interface in this display is communicating to the user the probabilities of incongruity, hazardous or malevolent behavior, the probability of presence of an Advanced Persistent Threat, and the list, identification and location of all machines, network components, nodes of these network components, where incongruous behaviors, malevolent or hazardous behaviors, or threats have been detected, with all the characteristics of the observed and recorded behaviors.

Reversibly, as the Bayesian learning modules are learning from both local and machine-to-machine operations, the system can also display the probabilities of incongruity, hazardous or malevolent behaviors, persistent threat behavior of its own outbound and/or outgoing communications. This latter functionality can be used, for example, for testing purposes when an administrator or system designer wants to test the resilience of a system to potential threats, abrupt change of environment or operating conditions. This functionality is also used for a network according to some implementations, in order to reinforce asymmetric and mutual protection of network components, as presented in FIG. 2.

Figure 1B:
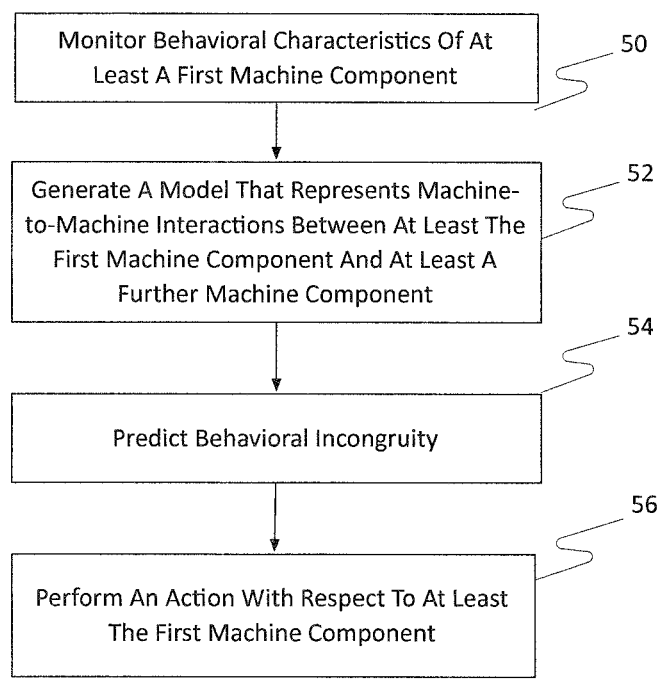
FIG. 1B is a flow diagram of an example process according to some implementations.

FIG. 1B is a flow diagram of an example process that can be performed by the system of FIG. 1A, or by another system, in accordance with some implementations.

The process monitors (at 50) behavioral characteristics of at least a first machine component. The monitoring can be performed using sensors deployed in a system, such as that shown in FIG. 1A. The sensors can be part of devices and can be located in a network. A "sensor" can refer to any device or machine code that can collect data associated with an entity, such as a device, machine code, and so forth. As used here, a "machine component" can refer to an entire machine, a component within the machine, a node in a network, an entire network, or a program or a portion of the program. The behavioral characteristics of the first machine component can include various characteristics that can be measured during operation of the first machine component. Examples of behavioral characteristics are discussed further below.

The process generates (at 52) a model that represents machine-to-machine interactions between at least the first machine component and at least a further machine component. More specifically, the process can generate, through unsupervised learning, an endogenous and continuous unsupervised Bayesian model that represents interrelations between local events and machine-to-machine interactions between at least the first machine component and at least the further machine component.

A "machine-to-machine interaction" can refer to an interaction (e.g. communication of data, control of one machine component by another machine component, etc.) between machine components. The "local events" are events that occur within a system that is the subject of the incongruity detection, such as the system shown in FIG. 1A. Local events are contrasted with external events that are received from outside the system. Examples of events can include network events (e.g. events associated with communication of information), events of network components (e.g. communication nodes such as switches, routers, etc.), events of devices that communicate over the network, and so forth. An interrelationship between events can refer to a dependency or some other type of relationship between the events. For example, consider the following local events:

Local event 1: a Universal Serial Bus (USB) key has been inserted into a device;

Local event 2: a console for kernel commands is launched; and

Local event 3: a process that establishes an outside communication (with an entity outside the system) has been launched.

Local events 1, 2, and 3 as set forth above are related to each other in that one event leads to (triggers) another event. The interrelationships between local events 1, 2, and 3 can be indicative of a device being hacked by a malicious entity.

The model that represents the machine-to-machine interactions can provide a representation of dependencies between machine components or a representation of any other relationship between machine components. In some examples, the model can be a Bayesian network as described in the present disclosure. The generation of the model, such as the Bayesian network, is performed without prior teaching, and without human intervention. Also, the Bayesian network provides, at each and every stage of a continual observation by the Bayesian network, a predictive model of the behaviors of the machine components and interactions of the machine components, without accessing functions of the machine components that direct these behaviors. The Bayesian network can have multiple stages at respective time points, and the Bayesian network can continually provide respective observations (predictions) at the respective stages.

The Bayesian network can be produced (created or updated) using unsupervised learning, and the Bayesian network can be an endogenous and continuous unsupervised Bayesian model (a Bayesian model that is produced in an endogenous and continuous manner). The production of the Bayesian network uses unsupervised learning since it does not have to involve human input or activity, such as in the form of rules, values, and so forth. A Bayesian network can be endogenous because the Bayesian network is produced using data local to the system that is the subject of the incongruity detection, and the production of the Bayesian network does not rely upon external sources or human expertise. The production of the Bayesian network can be continuous because the system is continually gathering data in an automated manner, and the system does not stop over time. The Bayesian network can be continually updated based on the continually gathered data. As used here, "continuous" can cover the situation where the system collects data at intermittent or periodic intervals, or collects data in response to specified triggers.

In some implementations, the Bayesian network records over time a probabilistic realization of a behavior, based on knowledge of characteristics, intensity and measures of other learned behaviors over time. A probabilistic realization of a behavior can refer to a measure of a probability of the occurrence of the behavior.

The process predicts (at 54), using the monitored behavioral characteristics and the generated model, an incongruity of a behavior of at least the first machine component and the machine-to-machine interactions, where the incongruity is predicted based on a discordance between an expectation of a system and the behavior and the machine-to-machine interactions, and wherein the predicting is performed without using a previously built normative rule of behavior and machine-to-machine interactions. More specifically, the incongruity is predicted based on determining a singularity of the local events and the machine-to-machine interactions, and a discordance between a calculated expectation of the system and an observed behavior of the system and the machine-to-machine interactions. Singularity of an event or a measure (such as of a machine-to-machine interaction) can refer to an event or measure that is based on the existence of other events/measures that are unknown to the system.

A normative rule can refer to any pre-established rule that can be set by a human, by an application, or by a machine that specifies a normal behavior (behavior of a machine or of machine-to-machine interactions that is specified as not exhibiting anomalous activity). More generally, the predicting (at 54) is performed without using a previously built normative rule of behavior, normative pattern (of data or code, such as specified signatures of malware), or previously built normative organization of behavior or data (such as functions of program code or arrangements of data).

Note that incongruity of a behavior is different from unexpectedness of the behavior. A behavior can be unexpected if the behavior is possible, but is unlikely based on past observations. For example, a blue goose in a flock of geese (including white geese, gray geese, etc.) may be unexpected because prior observations did not include blue geese. However, a blue geese is till possible. In contrast, a hawk flying with a block of geese can be considered an incongruous behavior, because this behavior is both unexpected and cannot be explained by existing knowledge of geese and hawks, and their previously observed interactions.

Stated differently, the concept of neighborhoods can be used to explain the difference between unexpectedness and incongruity. A neighborhood can provide a good approximation of some behavior that belongs to the same ontology. Over time, a system can learn by association what behaviors are frequently seen in the neighborhood of other behaviors, through Bayesian learning. The neighborhood can be a causal neighborhood—one behavior can be the cause or the result of another behavior that has been learned over time. Thus, in the foregoing examples, a blue goose flying with a flock of geese is in a neighborhood relating to behaviors of geese. However, a hawk flying with a flock of geese would not be in this neighborhood.

Predicting the incongruity can be based on determining the singularity and an idiosyncrasy of a detected behavior, as determined and defined as a mathematical impossibility to explain the detected behavior with the Bayesian model, combined with a probabilistic distance between the detected behavior of at least the further machine component to an expected behavior of at least the further machine component, as expected by at least the first machine component given a behavior of at least the first machine component. Idiosyncrasy is a structural or behavioral characteristic peculiar to an individual or a group.

In some implementations, a state of incongruity can be based on the existence of three probabilistic conditions:

(1) An event or measure cannot be reproduced by a behavioral model (e.g. Bayesian network) that has been built over time; in other words, the event or measure differs in association and purpose with previously observed behaviors.

(2) The event or measure presents a gap in value and scale of conditional probabilities that are much higher or much lower (based on some specified thresholds) than a variation that could have been predicted, and hence, expected by the Bayesian network; and (3) The distance between the state of the learning model (Bayesian network) before and after discovering and computing a new event or measure (as gathered by a sensor).

A behavior has a singular characteristic if the behavior both changes over time and across machine components, and if the change in intensity, origin, purpose and direction of the behavior cannot be explained by the learned behavioral imprint (Bayesian network) built by the system over time.

The process performs (at 56) an action with respect to at least the first machine component in response to the predicted incongruity.

In accordance with some implementations, the system can also find a most probable machine component for a given behavior, and to find a probable behavior for the given machine component, by retrieving a recorded identification of a machine component or a process that has exhibited a highest cumulative incongruity over time, in comparison to other machine components or processes.

In further implementations, the system can find a most probable machine component, in a population of machine components, exhibiting symptoms of incongruity and/or an Advanced Persistent Threat (APT), and to isolate an incongruous or potentially APT behavior from characteristics of the most probable machine component. In addition, the system can, based on highest scores of an APT intensity computed by probabilistic inferences over time, allow a forensic analysis in real-time and over time, by tracing back the highest scores of incongruity in the machine components.

It is noted that keeping behaviors over time allows for being able to detect an older behavior that may have triggered a latter incongruous behavior.

Figure 2:
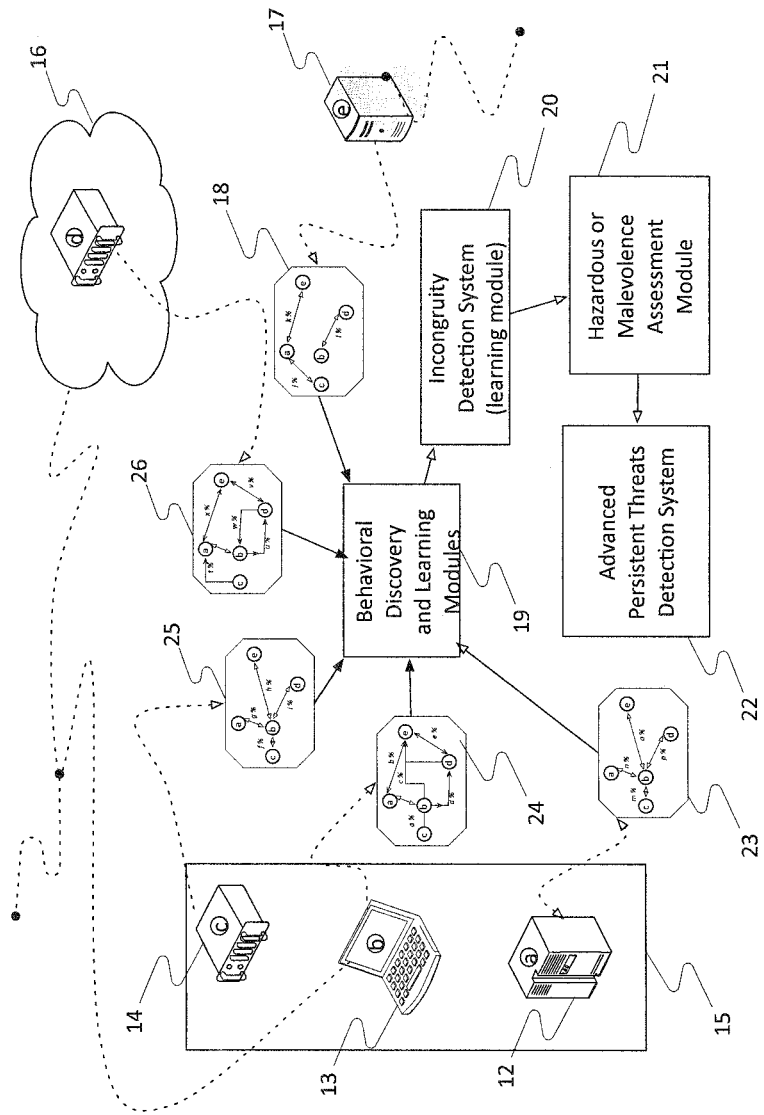
FIG. 2 is an overall view of an network arrangement according to some implementations.

FIG. 2 presents an example network arrangement in which various devices are able to communicate over a network. A Behavioral Discovery and Learning Module 19 is learning from behaviors directly captured (18, 23, 24, 25, 26) in each node or component of the network. These "nodes" or network components can include an independent machine 17 distantly connected to the network, a cloud-based machine, or a component 16, a server 14, an individual machine 13, a calculator 12, which can be grouped in a local area network 15, such as in an embarked system, a distant monitoring system, etc. The system operates as described in FIG. 1A. Here, the difference is that Bayesian learning modules 19, 20, 21, 22 (that correspond respectively to modules 10, 3, 11, and 22 of FIG. 1A and perform similar tasks as the respective modules) are embodied into a distributed autonomous component that resides directly on network components that use the system.

FIG. 3 illustrates an example "TOTE" (Test-Operate-Test-Exit) model. This diagram presents the role of congruity and incongruity in behavioral discovery.

Figure 4:
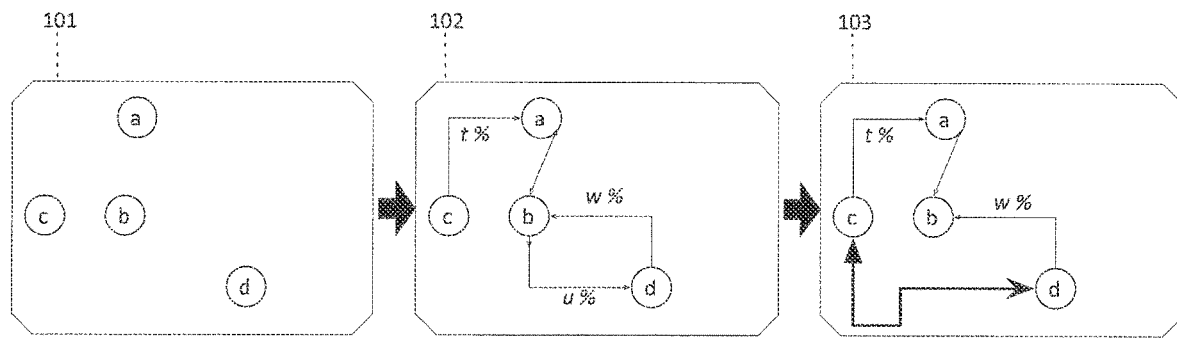
FIG. 4 is a schematic diagram of an example process executed by the system of FIG. 1A to discover and learn the behavior of nodes, machines and components, and hereinafter referred as "a behavioral discovery and learning module," in accordance with further implementations.
Figure 4:
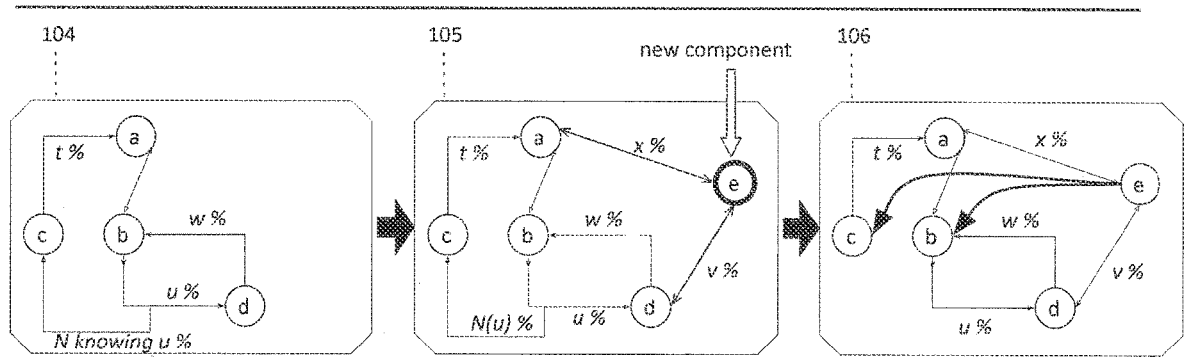
Figure 4:
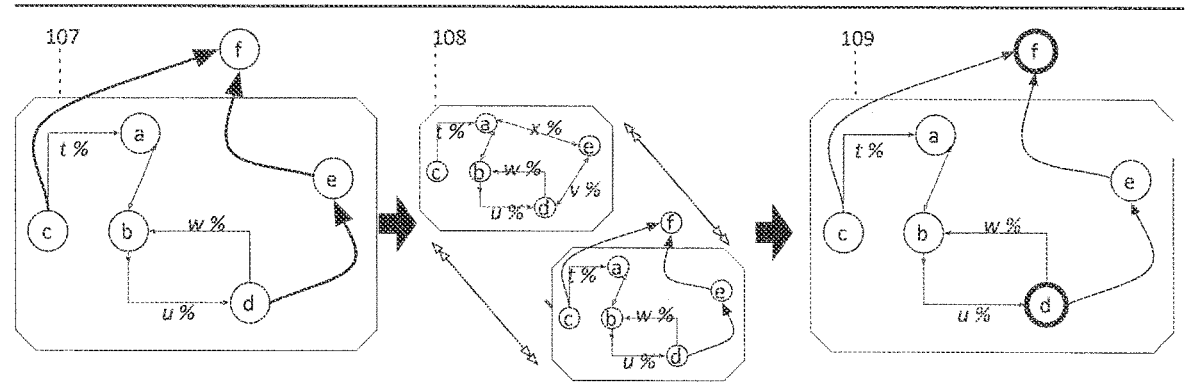

FIG. 4 illustrates example tasks performed by the Behavioral Discovery and Learning Module 10 (FIG. 1A) or 19 (FIG. 2). This module can include a Bayesian learning engine. In task 101 (discovery of components or nodes), machine components (here, a, b, c, d) (which can be entire machines, components within machines, network nodes, a network, and/or programs) that interact with each other are discovered by the learning module (10 or 19). Discovery is accomplished through scanning and analyzing new events or signals that are accessible by the operating system 7, the machine-to-machine communication device 1, the machine-to-machine communication interface 2, the communication program 5 and other devices 9. The discovery is triggered by any attempt of interaction, but is not based on pre-established semantics or prior knowledge of the functions, signatures, normative behaviors of the machine components. Some implementations are purposefully designed this way as to enable the discovery of new behaviors, without prior knowledge. The objective of the discovery of machine components is to establish the population of events, signals and behaviors that the system will watch and learn.

The events can be local events, such as "creating a new file," "opening a communication port," "accessing a registry," taking place at the level of operating system 7, or network events and operations, such as "enabling a communication," "scanning for an open port of communication," "requesting an authorization," taking place in the machine-to-machine communication interface 2.

Task 101 (FIG. 4) discovers machine components, by observing, in task 102, the interactions of discovered components, elements or nodes, and calculating their conditional probabilistic frequencies of interactions (tasks 102 and 103)

For each discovered machine component, the behavioral characteristics are recorded and stored in storage 4, for later usage by the Bayesian learning engines 3, 11 and 12 (FIG. 1A) or 20, 21, and 22 (FIG. 2). The characteristics that are learned can include any or some combination of the following examples, adapted to a machine-learning context, and to machine-to-machine events:

The relative frequency $X_{1(n)}$ of interaction with the machine component (measured as the ratio between frequency of interactions of this machine component to the overall frequency of a population of interactions), The relative specificity $X_{2(n)}$ (as 1 to 1, 1 to few, 1 to many, many to 1, few to 1, etc.), and measured as the proportion of the machine component's interactions that are specifically addressed to a receiving machine component, as compared.

The relative interaction intensity $X_{3(n)}$ (as measured by the probabilistic delay between two manifestations, feedback time, etc.).

The relative mortality $X_{4(n)}$ of interactions of the machine component (as defined by the diminishing proportion of an event on the overall population of events over time).

The relative mutual intensity of interaction $X_{5(n)}$ (as defined as the number of mutual interactions between the discovered machine component and another machine component, compared to the Bayesian average of mutual interactions).

The relative propensity of a receiver to be the first to trigger an interaction with an emitter $X_{6(n)}$ (measured by the Bayesian average of interactions coming from the receiver to the emitter, compared to the number of interactions between the machine component and the receiving machine component).

The targeted intensity $X_{7(n)}$ (measured as the proportion of targeting the receiving machine component, as compared to Bayesian average of the number of untargeted interactions in the overall population of interactions; this measure being used to evaluate the asymmetry of interaction between two nodes, components or machines).

The community index $X_{8(n)}$ (measured as the number of interactions that present a behavior parallelism towards the receiving machine component).

The relative bandwidth usage $X_{2(n)}$ of the machine component,

Task 102 (learning of conditional probabilistic frequencies of interactions) can be performed in the absence of preconceived rules of communication concerning the machine-to-machine interactions that are being recorded in real time. In this task 102, the conditional probability of a learned event to trigger or interact with another machine component or event is measured as the relative frequency of a machine component (a) to interact with a machine component (b), knowing the probability of interaction with other machine components (b), (c), (d). The system increments the probabilistic table of relative frequencies of interaction of a given machine component (a), knowing the other relative frequencies of interactions of machine components (b), (c), (d), etc.

In task 103 (discovery of new interactions and change in previous interactions), the process generates a Bayesian directed acyclic graph, representing the discovered interactions between observed machine components. The learning module 10 observes the overall interaction behavior of the machine components and auto-generate conditional relationships between all its characteristics, such as overload (the relative level of resources available for incoming data in comparison with the overall level of resources needed at the level of activity); bandwidth usage (the relative intensity of machine interaction, related to the overall machine interactions taking place); the relative mortality of a machine component's interactions; the relative interaction intensity (the delays, speed, temporality of the current interaction in relative frequencies of previous interactions), etc. As new interactions occur, the Bayesian learning module is recording the change in interactions, or the discovery of new interactions between machine components.

An aspect of some implementations relates to a process for detecting and preventing incongruous behaviors leading to persistent threats into a network of machines, components, software programs, or individuals using machines and networks in order to interact with each other, without an external teaching of rules or normative description of incongruous behaviors. Some implementations relate to the creation of an autonomous learning system that allows machines and networks to continually and autonomously assess the incongruity or congruity of their behaviors, deeds and interactions, without interrogating an external database, and without accessing human expertise. A functionality of some implementations is to detect and prevent threats to network and machines, which can be referred to as "Advanced Persistent Threats."

Task 104 (weighing the probability of newly discovered interactions knowing the probability of other interactions) includes weighting the probability of newly discovered interactions, knowing the probability of other interactions of the observed machine or network. Task 105 (discovery of a new component or new node and learning of its interactions)

includes the discovery of possible new machine components in order to allow the discovery of an unexpected behavior in the observed machine or network (task 106—discovery of an unexpected behavior of new node or component).

Task 107 (measuring the behavioral incongruity of new node behavior knowing the probabilistic congruity of other nodes' behavior) extracts the probabilities from the previous tasks, measuring in task 107 the behavioral incongruity of the new machine component's behavior, knowing the probabilistic congruity of other machine components' behaviors.

Task 108 (calculating the dynamic distance between previously learned machine behavior and newly observed behavior) includes calculating the dynamic distortions and dynamic distances between previously learned machine behavior and newly learned observed behavior. Task 109 (identifying which node(s) most increase overall incongruity machine behavior) determines which machine component(s) is (are) most likely to increase (prediction), or have the most increased (past behavior), the overall incongruity of the machine or network behavior.

This process allows to satisfy the ability to qualify and measure the incongruity of a machine behavior without calling for a human judgment, by giving to a network or a machine its own computational capability of assessing in real time the congruity, or incongruity, of its own behavior, and of the behaviors of other machines or components, with which it interacts.

Figure 5:
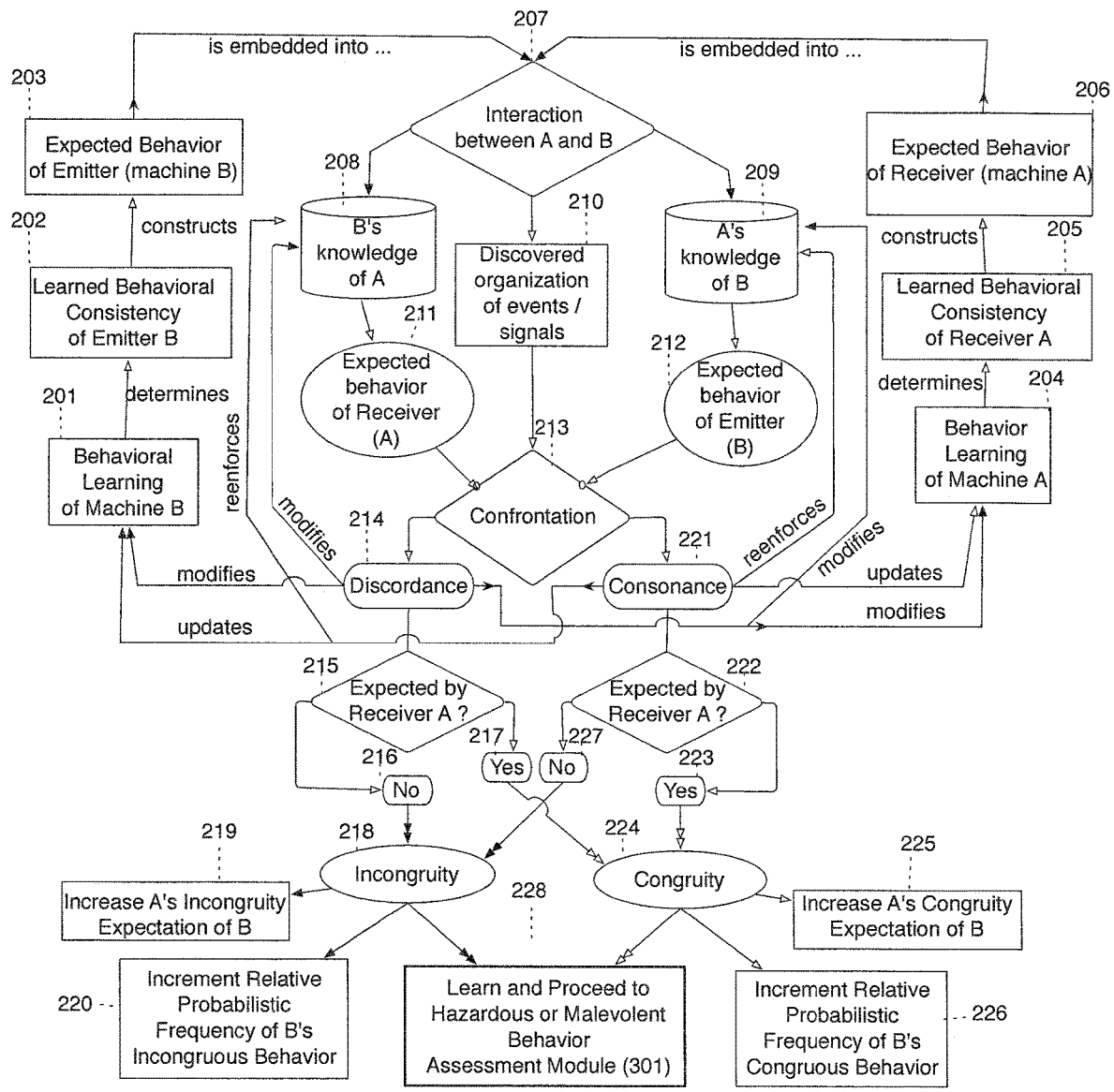
FIG. 5 is a schematic diagram of an example process executed by the system of FIG. 1A to discover and learn incongruous behavior and behavioral incongruities of nodes, machines and components, and hereinafter referred as "an incongruity detection system," in accordance with some implementations.

In particular, this process allows determining the congruity or incongruity of a machine behavior by continually comparing the prediction of the machine behavior with the help of a Bayesian network that has autonomously learned this behavior, with the actual behavior that the method and system is observing (FIG. 5). This process increases the data determinacy of a machine, by allowing the machine to continually build a dense and granular knowledge of the causal reasoning of its own actions, without depending on the external teaching of an expert or a human being. Contrary to previous solutions this process allows for machines and computer or electronic networks to build their own situational awareness of their behaviors, data transfers, sensing, interacting with their environment and their own constituents and components.

Some implementations are able to solve the general problem of discovering incongruous and undesirable behaviors, by autonomously discovering these new potentially harmful behaviors by the sole independent machine learning according to some implementations. These previously unknown flaws in a system can be referred to as "zero-day" vulnerabilities, i.e. vulnerabilities that are still at zero count of solving solutions in terms of number of days.

According to some implementations, a machine, a system of machines or a network (of computers, sensors, electronic components) can pursue its operations in very degraded conditions, such as with a partial network, in a degraded environment, and without certain connections (e.g. Internet connection). Techniques according to some implementations can be applied in a decentralized and autonomous manner, in some cases. As the method and system allows a machine, a set of machines or a network to assess its consistency and congruity autonomously, it does not depend on an external access to knowledge, or external access to a communication network that could have been destroyed, truncated, switched off, or made inaccessible by a crisis or an attack situation. This functionality in some implementations can be useful for robots, machines, transportation systems, financial transaction platforms, healthcare technologies, that should continue to perform to support life, protect economic systems, in times of catastrophic disasters, war, crises, sabotage or compromised operations by external attackers.

A system and network administrators, machine operators, system and network commanders, can be provided with a continual self-knowledge and self-assessment provided by the networks and machines about their own consistency and their own behavioral congruity. Advantageously, some implementations allow for operators, without previous knowledge of the machine or network, to rapidly identify the components or parts of the network or machine that displays the most incongruous behaviors within the observed set of machines or networks. As the method and system historically learns and stores the causal learning of its own behaviors, the method allows for an intervention team, can be referred to as a "red team," to investigate an incident, a data leaking, an unwelcomed intrusion, to be swiftly investigated with an in-depth knowledge of the history of incongruous behaviors that occurred in the machine or network, where they took place, and what causal attributions have been recorded for the discovered incongruous behavior.

Another problem is that intrusion detection systems that are based on signatures of malicious codes are dependent on the external production, by industry suppliers, specialized firms, researchers and security experts, of databases listing and describing these malicious codes and threats. Advantageously, the proposed method and system does not have to use external knowledge, and can therefore continue to assess its own vulnerabilities with its own learning, even if external codified knowledge of threats is not available, and even when human expertise is not accessible. This characteristic of some implementations of the present disclosure is useful when systems have lost all or most of their connectivity, when connectivity and communication capabilities have been damaged or lost, or when the system is in a very adversarial environment where it is unable to establish a trustworthiness of an interacting party. This situational context is referred to as an "adversarial environment," and the learning in such an environment is referred to as "adversarial learning."

An adversarial learning is a situation where a system or a set of machines, components or software is forced to continue to learn against its own premises, against its own knowledge, or by using a set of knowledge that has been designed, or is by accident designed, as to destroy, paralyze or impede its learning. Systems, critical infrastructures, embarked systems, transportation components, smart grids for energy networks, can be put in such situations when they are compromised by a malevolent software, such as a software is referred to as "advanced persistent threats," which are designed to impede their causal learning and deceit their defenses. Advantageously, the proposed method and system allows to pursue learning in an adverse learning environment, and to overcome a learning situation where the rules of learning have been tempered with, or have been manipulated, as the method can discard external knowledge and external teaching and continue its learning autonomously.

In response to the tasks 101 to 109 that perform updating of self-knowledge and the discovery of new components and new machines interacting with a system's own components or constituents, a process according to FIG. 5 can be performed in some implementations. FIG. 5 illustrates an example process of the Incongruity Detection System 3 (FIG. 1A) or 20 (FIG. 2). In FIG. 5, task 201 records the behavioral learning of machine or component B. In task 202, the process calculates the consistency of emitting machine component B (where "machine component" can refer to an entire machine or a component within the machine or a network) by measuring the dynamic distortion with previous learning of machine component B, or when nonexistent, with other machine components that have displayed identical or similar behaviors of machine component B within the same network or machine. Task 202 is used to construct the autonomous learning of the archetypal behavior of machine component B, which is symbolized by a causal learning network, referred to as a Bayesian belief network (Bbn) that captures and reproduce the causal behavior of machine component B. When task 202 is performed, the Bayesian belief network (Bbn) of machine component B is amended with the new causal rules discovered, the new arcs that have been inducted by observation, and the new relative frequency weighting of these new arcs for this given machine behavior of B. As a result, the process allows possessing an acute and working model of B's behavior, which can produce predictions of B's behavior when new evidences of behavior are propagated into the Bayesian belief network (task 203).

The same tasks 201-203 are conducted to capture, transform into a Bayesian belief network, and produce expectations for machine component A (in some examples, machine component A can be an existing machine component while machine component B can be a new machine component that has been discovered). As machine component A is likely to be the local machine component being protected by the process, the events being captured in tasks 204, 205 and 206 can be local events, i.e. events and operations that machine component A is running in order to perform its daily operations, including network operations, manipulation of data, numeric transactions, etc.

Figure 9A:
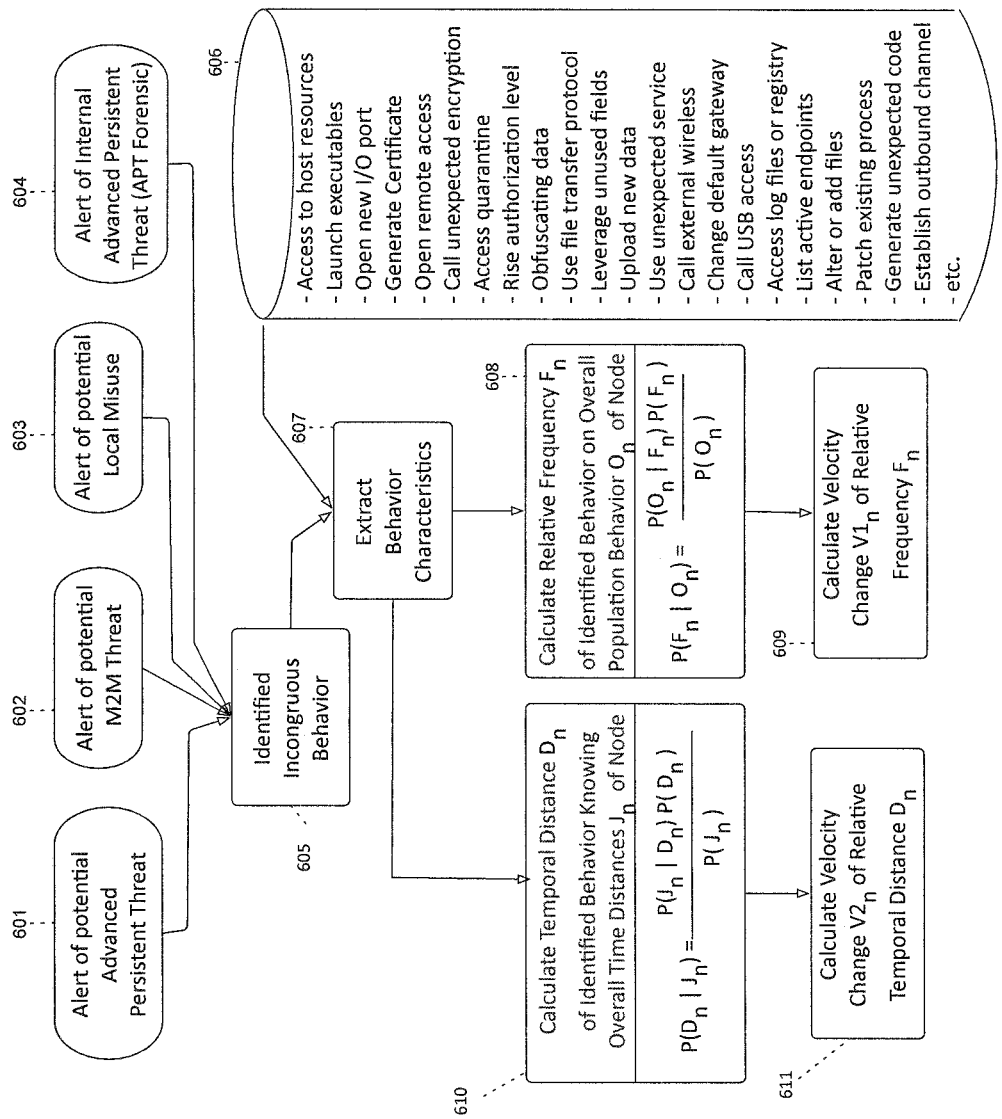
FIGS. 9A-9B depict a second part of the schematic diagram of an example process executed by the system of FIG. 1A to learn and characterize the behavior of APTs discovered by the APT Detection Module, and hereinafter referred as "a probabilistic characterization of APT behavior module," in accordance with some implementations.
Figure 9B:
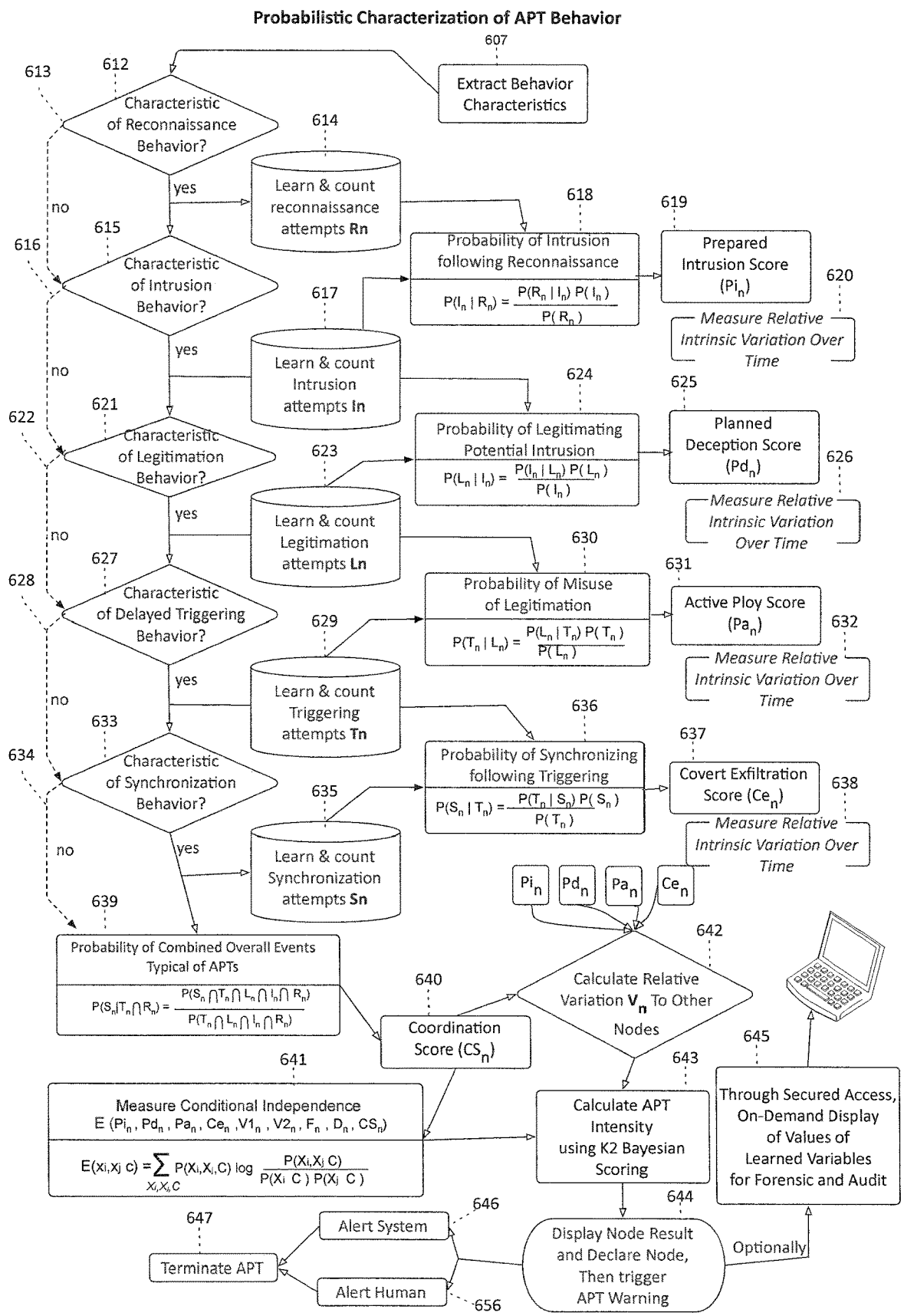

In task 207 (FIG. 5), the process analyzes the interaction between existing machine component A and new machine component B. In tasks 208 and 209, the process allows building the self-knowledge of the behavior of machine component A, and the knowledge of the observed behavior of machine component B. Behaviors of machine components A and B are captured by the behavioral discovery and learning module 19 (FIG. 2), which captures behavioral characteristics of observed machine components, such as data being exchanged, relative frequencies of these exchanges, ports of communication, software routines being used, etc., such as examples provided in 606 (FIGS. 9A-9B).

In task 210 (FIG. 5), the process records the discovered organization of events and signals that are being exchanged during the interaction of A and B. The result of this observation is a statistical description of the interaction between machine component A and machine component B. This architectural organization is described by a Bayesian graphical model, which measures the probabilistic design of interactions between A and B. Over time, this discovered, then learned, architecture of the relation of A and B is recorded, and challenged against the predictions of the next behavioral architecture against the previously learned architecture of interactions.

In tasks 211 and 212, the process uses the results of the causal learning conducted by the Bayesian network in task 210 to calculate the expected behavior of machine component A (211) and the expected behavior of machine component B (212). In task 213, the expectation of behavior of A is confronted with its own prediction in order to calculate the distortion and distance between the actual behavior of A and the prediction of behavior of A. Likewise, in the same task 213, the prediction of expected behavior of machine component B is calculated using the conditional probabilities Bayesian engine, and compared to both the expectation of behavior B knowing the expected behavior of A, and vice-versa, the expected behavior of A, knowing the expected behavior of B. This confrontation of expectations is used to calculate the incongruity of behavior B, knowing behavior A, and reversely, the incongruity of behavior A knowing the behavior B, as a mismatch in scale, deeds, destination, speed, volume, contextual constituents, and characteristics including, but not restrictive, to those listed in base 606 of FIGS. 9A-9B.

In task 214, the process calculates the discordance between expectations of behaviors A, knowing B, and behavior B, knowing A. This discordance is calculated by a mathematical function that assesses the level of dynamic distance and dynamic distortion, using mathematical algorithms measuring how distant are the two behaviors, including the expected versus actual diversity, causal ambiguity, variance explanation, that relates the two behaviors. This score of discordance is compared, when they exist, to previous scores of discordance in expectations calculated by the system in previous interactions. If there are no previous scores of expectations, then the system records and learns, for the first time, the newly discovered discordance. Scores of discordance are always compared, in the proposed method, with learned scores for similar or neighboring archetypes of similar behaviors. Hence, advantageously, in the proposed method and system, the learning is autonomous and does not depend on external teaching or external knowledge, neither from a human expert, nor from an external database.

In task 215, the process calculates the distance of expected behavior of B, with the actual prediction of behavior B by the learning of A. This task allows for the method to answer the question as to know if A expected the behavior of B. The answer to this question is continuum between the complete absence of expectation (216) or the full expectation (217). A full expectation can be defined as the result of the observation being extremely closed to its prediction (217). A behavior is declared incongruous, in task 218, when the actual calculated and observed behavior of B does not match the calculated expectation of A. When this result is achieved, in task 219, the Bayesian belief network of machine component A will increase the Expected Incongruity score of B (task 219), while incrementing the probabilistic frequency of B's incongruous behaviors, for each of the observed behaviors, for each of its causal relations. For example, the process has allowed the discovery of an incongruous behavior in the origin, size, origin and destination of a large chunk of data, not previously expected from machine component B (task 220). The process detects this incongruous behavior, and immediately learns that machine component B is capable, in a probabilistic and conditional range to display such behavior. The process then compares this range with known ranges of archetypal behaviors of B, or machines and components that are probably close or similar to B. Hence, advantageously, techniques according to the present disclosure allow for a machine, a network or system of components to create a local learning, at the distributed level of each of these components, to keep a dynamic and learning memory of the congruity and incongruity of its own behaviors, and of the behaviors it has encountered with other machine components in machine-to-machine interactions.

In contrast if the behavior of machine component B is, as the result of the propagation of evidence into its Bayesian belief network, close to its expectation (task 217), then the conditional probabilities of a "congruous behavior" is incremented in task 224.

Advantageously, in some examples, the process takes into account the absence of symmetry in congruity and incongruity perception and expectations. This axiom, referred to as "incongruity theory," stipulates that if a receiver A is expecting a very incongruous behavior from an emitter B, then the receiver A will consider that the behavior of B is "congruous," as the incongruous behavior was indeed expected. This flaw of human perception has been used by system penetration techniques that include ingraining, very progressively and continually through weak signals, small incongruities into a system to increase this system's tolerance to an incongruous behavior. This technique is referred to as attacks through social engineering, which uses similar signaling techniques, to progressively render undetected an intrusion behavior.

Human intervention, either from a network administrator or an expert, can involve auditing the network, the machine, the communications, the components in the hope of detecting a deception strategy or a software component designed to deceive intrusion detection systems (IDS). Such human intervention-based techniques can be highly disruptive, and highly unpredictable, as the objective of these deceptive strategies is indeed to deceive the human inspection of the machine or network.

Task 221 measures the consonance, expressing the congruity of mutual expectations of machine component A and machine component B. The process hence allows to compare incongruous behavioral expectations of A regarding B, and simultaneously, congruous expectations of A regarding B. In task 223, if behavior of B is congruous to expectations from A, even if this behavior is overall incongruous compared to its calculated archetype, a score of congruity is computed, and recorded in task 224. When this task is completed, if positive, the process allows for increasing the conditional probability A's expectation of a congruous behavior from B (task 225). Over time, the probabilistic conditional occurrence of congruous behaviors (in regard of its learned expectations, compared to observations) from B, according to A, is incremented and learned in task 226.

The process including tasks 201 to 228 can conclude the completion of the autonomous assessment of the congruity or incongruity of the behavior of machine component B, from machine component A. The process record results of the process in task 228, and then proceeds to the hazardous and malevolent behavior assessment task (301 in FIG. 6).

In the present disclosure, malevolence can be defined and assessed as a potentially harmful behavior that can disrupt, dismay, deceive, discontinue or destroy a targeted machine or network. This potentiality is measured, in the present disclosure, by an autonomous assessment based on findings and discovery that are generated by the machine and network itself. Advantageously, malevolence in the present disclosure is assessed autonomously, without having access to an external human expertise or teaching.

Figure 6:
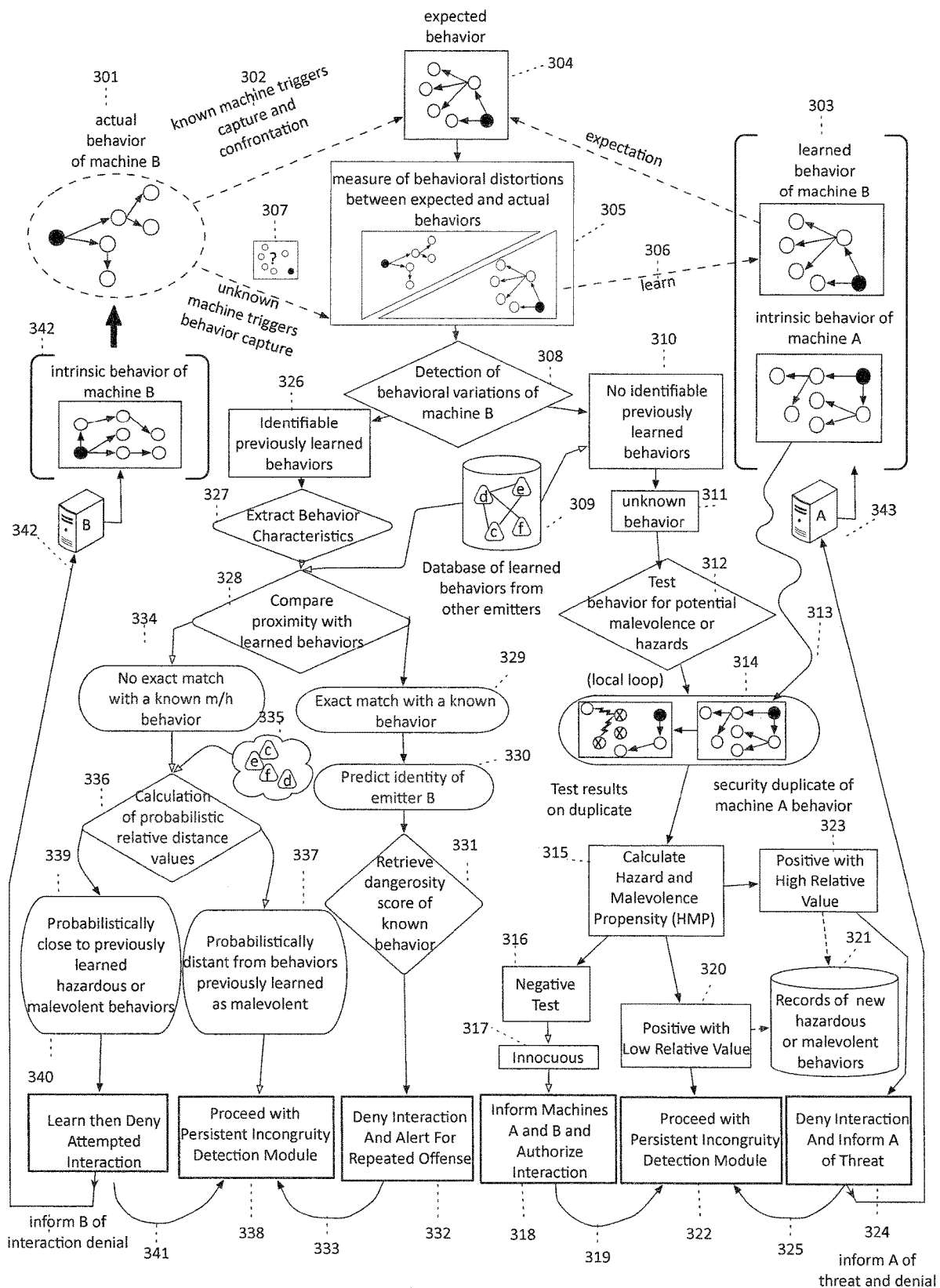
FIG. 6 is a schematic diagram of an example process executed by the system of FIG. 1A to discover and learn malevolent or hazardous behaviors of nodes, machines and components, and hereinafter referred as "a malevolent and hazardous assessment module," in accordance with some implementations.

FIG. 6 illustrates an example process of the Malevolent and Hazardous Behavior Assessment Module 11 (FIG. 1A) or 21 (FIG. 2). In tasks 301 to 341 in FIG. 6, a process allows evaluating the harmfulness of newly discovered and past behaviors, as to compare their distant probabilities with newly emerging behaviors.

In task 301, the actual behavior of the interacting machine component B is captured, following the process previously described (101 to 109 in FIG. 4). In tasks 302, 303, 304 305, 306 and 307, expectations of behaviors are compared with actual occurrences and characteristics, according to the process described in the tasks 201 to 228 (FIG. 5).

In task 308, behavioral variations are detected by comparing the conditional probabilistic relative frequency of occurrence of the observed behavior, with the same probability concerning this same machine component B, and compared with archetypes of behaviors learned over time. If the observed behavior of machine component B is not identifiable with previously learned behaviors (task 310), then it is declared as a "unknown behavior," and recorded as such for further treatment in task 312.

In task 313, evidence of intrinsic behavior of machine A is injected in a Bayesian belief network (Bbn), which emulates the identified unknown behavior on a duplicate local loop of the concerned part of the network. Advantageously, this duplicate loop allows acting as an experimental buffer, or continuous test bench, in order to measure the conditional probabilistic effects of the incoming (unknown) behavior (task 214). Malevolence is measured by the conditional probability, and its relative frequency, of triggering disruptions, data leaks, illicit data transfers, incongruous or unexpected elevation of administrative rights, change in identity, among other identified processes listed in task 606 of FIGS. 9A-9B.

Advantageously, this list is not normative and not fixed in time or length. Every new combination of behaviors that can produce a malevolent effect will be learned as such. Learning is contextual, situational and conditional, using Bayesian belief networks (Bbn) and evolutionary learning algorithms. In task 315, the method allows the computation of a hazard and malevolence propensity score (HMP), measured by the conditional probability of the behavior B of triggering various destructive behaviors. A consistent negative test, in task 316, would lead to the declaration of the behavior of machine B, in this instance, context and interaction, as "innocuous," and appended as such, in task 318, in the node's learning database, and will then proceed to tasks 318, 319 and 322. A high relative value of hazard, in tasks 320 or 323, and malevolence propensity, may lead to the denial of the projected interaction (task 324), or the information of a potential, or both processes, according to the level of probabilistic sensitiveness given to the method and system by the machine designer, owner, administrator, or by the machine itself, if the user or administrator decides to let the algorithm auto-regulate its malevolence detection level. When tasks 324 or 317 are achieved, the analysis proceeds with the persistent incongruity detection module (322).

If the behavioral variations of machine component B, in task 308, have been identified as the product of conditional probabilistic variations of previously known behaviors (task 327), the evolution of the behavior characteristics are extracted in task 326, while the database of learned behaviors from emitters (B1, B2, . . . , Bn) is incremented in task 309. In task 328, the proximity of newly learned behaviors with previously learned behaviors is measured by calculating the dynamic probabilistic distance between the Bayesian belief networks encapsulating the behaviors of each node (C1, C2, . . . , Cn). Scores of hazard and malevolence computed in previous task 315 are extracted, and injected in the comparison model as to assess the distance between newly discovered behaviors, and behaviors that already have a potential malevolence. If an exact match is found (task 32), then the method allows predicting the potential identity of emitter B as carrier of a recurrent malevolent behavior. The relative recurrence, compared to the recurrence of other related malevolent behaviors, allows estimating a danger score for the known behavior, eventually leading to the denial of the interaction (task 332) for repeated offense, if the identified malevolence presents a strong intensity.

Alternatively, if the probabilistic distance between known malevolent archetypal learned behaviors, and the new behavior B, does not present an exact match (task 334), then the comparison algorithm is extended to other archetypes of malevolent behaviors, as to identify a possible behavioral variation of a known threat, in tasks 339 or 337. This second test can lead to a denial of the attempted interaction, with the same above conditions of adjusting the level of sensitiveness to various degrees and archetypes of malevolence (by a human decision, or by letting the system auto-regulate this sensitivity level). In task 338, the system proceeds with the persistent incongruity detection module.

Figure 7:
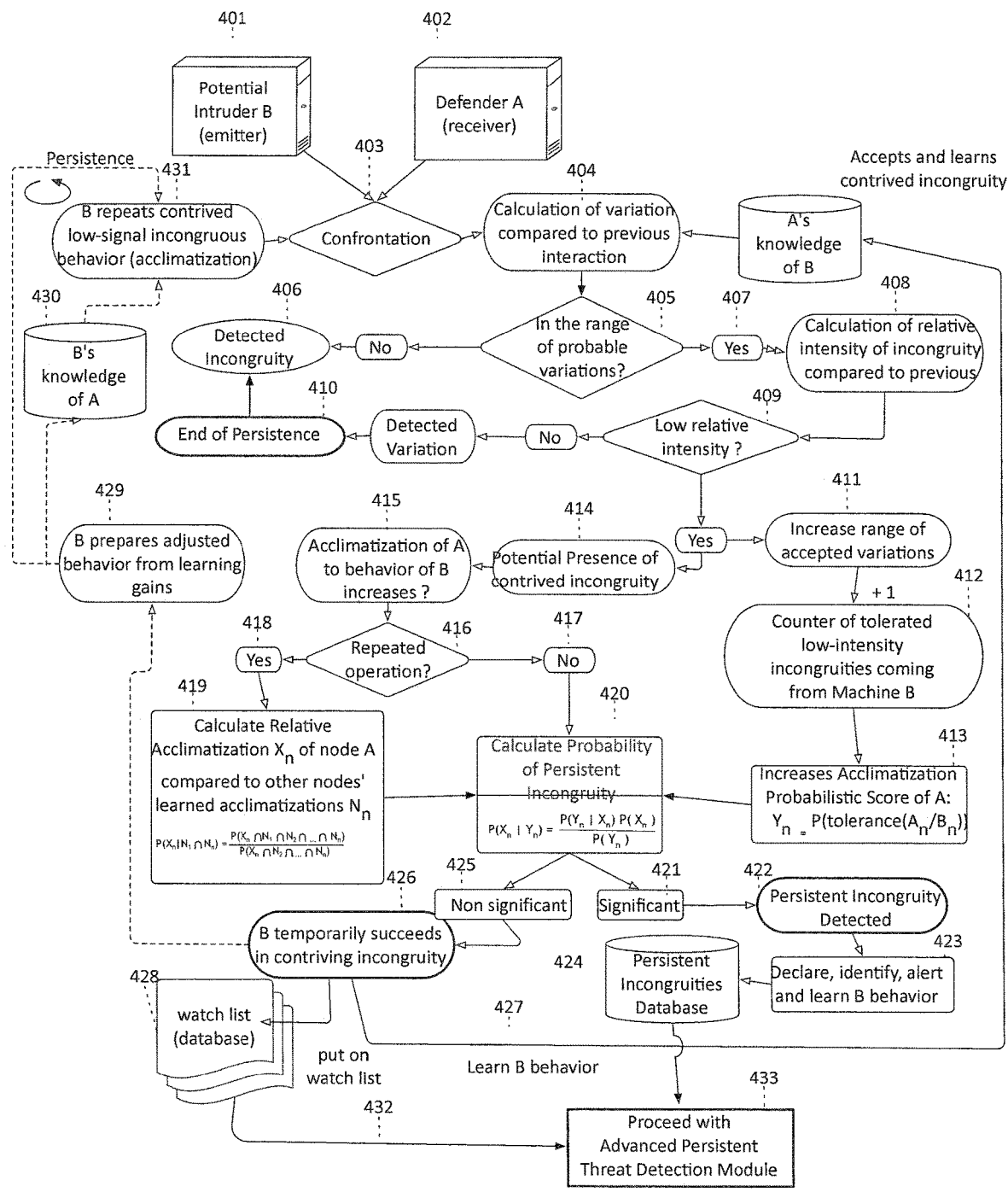
FIG. 7 is a schematic diagram of an example process executed by the system of FIG. 1A to discover and learn the persistence of an incongruous behavior of nodes, machines and components, including its probable acclimatization and its probable preparation and induction, and hereinafter referred as "a persistent incongruity detection module," in accordance with some implementations.

FIG. 7 illustrates an persistent incongruity detection process, which is a preliminary process used to engage in the characterization of an Advanced Persistent Threat. As a routine, the persistent incongruity detection process can be called and applied when requested by the system.

The objective of a persistent incongruity detection module (FIG. 7) is to defeat a penetration or deception strategy that would be based on ingraining into a targeted system very small variations (weak or low signals) of incongruous behavior, in order to "acclimate" the targeted system to the presence of an incongruous element, signal, component, software or intruder. A generic term "intruder" (401) can be used to describe such presence, or such attempt to deceive a system through reconnaissance, and then slow ingraining of imperceptible behavioral variations. Advantageously, the method and system of the present disclosure allows defeating such penetration and deception strategy, which have been a recurrent issue for the industry.

According to some implementations, a process can learn over time a persistence of incongruities and incongruous behaviors of machine components, to detect contrived incongruities and deliberate acclimatization to planned incongruous behavior in the system. The process can record over time different learning states of the machine components, and encapsulate, for each learning state of the learning states, a calculated level of incongruity of each machine component of the machine components. The encapsulating of the level of incongruity allows the possibility of conducting a forensic analysis on all historical states of behavioral imprints of the system over time, and eventually tracking back in time levels of incongruity of the components and their causal attributes (attributes specifying or identifying the causes of the incongruity).

In tasks 401 and 402, machine, network components, or constituent's behavioral learning are confronted (task 403), by analyzing the results and statistical (probabilistic, Bayesian) findings of other modules (produced by processes of FIGS. 4, 5 and 6, for example). The persistent incongruity detection module measures if a behavior B, knowing the behavior A, displays over time a deliberate and contrived incongruity of the same archetype, nonetheless of possible other variations, or other anchorages (addresses, ports, memory, storage) in the targeted system.

In task 404, the variations of behavior in the interaction of A and B are calculated with the process of FIG. 5 (injection of findings). In task 405, the overall variations are compared to the narrowest and the largest previously learned range of interactions between A and B. As the objective is to detect variations that have been purposefully designed to display small variations (in proportion and in relative frequencies), outliers and behaviors out of range fall into the category of fully expressed, and explicit, incongruities (task 406). On the contrary, when behavioral variations stay in known narrow ranges (407), where variations differ by less than a specified threshold, then the relative levels of incongruity (probabilistic scores) is calculated in task 408. Low relative incongruity intensity, calculated as being inferior to the lowest range that can explain the behaviors in the weakest signals category, will trigger, in task 409, further computation to investigate the potential presence of a persistent incongruity. Otherwise, in task 410, the persistence of the incongruous behavior will be declared as "ending," or non-existent, and incongruity will, as such, be considered as fully blown, explicit and expressed (406).

In the presence of a potential contrived incongruity (414), as inducted in task 409, the process first modify the range of accepted incongruous variations (411), in order to learn a new form, morphing, expression, intensity, shape or vector of incongruity concerning behavior B. The objective of this learning is to record, and count, the number of tolerated low-intensity incongruities coming from machine component B (task 412), as to increase the probability that machine component A will acclimate to small, imperceptible, variations of incongruous behaviors of machine component B. The acclimatization probabilistic score of machine component A, towards machine component B, is recorded for further computation (task 413).

The other section of the process, from task 414 to task 420, aims at identifying persistence in an increase of acclimatization of the target "Defender A." In task 415, the acclimatization score of A, knowing B, is compared to previous scores of interactions. If there is a persistent increase over time (418), then this acclimatization is compared, in real time, to the acclimatization scores of comparable archetypal nodes or components, and to the closest functional or geographical neighbors of Defender A (task 419).

If the acclimatization does not increase over time, yet has been detected (417), then the system proceeds to task 420, which launches the computation of a probabilistic score of persistent incongruity, expressed as a combined probability of increased targeted acclimatization over time (419 and 413). If this probabilistic score is statistically significant, then the system declares the detection of a persistent incongruity (422), potentially alert networks administrators or human attendance (423), if this option has been chosen, or alternatively, inform the command and control functions of the computer, network or machine (if a full automation and an absence of human interference ahs been chose), then records it for further display (424). As long as the probabilistic score of persistent incongruity is not significant (425), the autonomous and automated surveillance of the low intensity incongruous behavior is maintained (426 and 428), while the behavior of B is learned, and evidence are re-propagated in to the reasoning Bayesian and probabilistic engine (427). When the overall learning is satisfied, by the condition of the non-detection of a persistent incongruity, or vice-versa, then the system proceeds to task 433, to the persistent threat detection module.

Figure 8A:
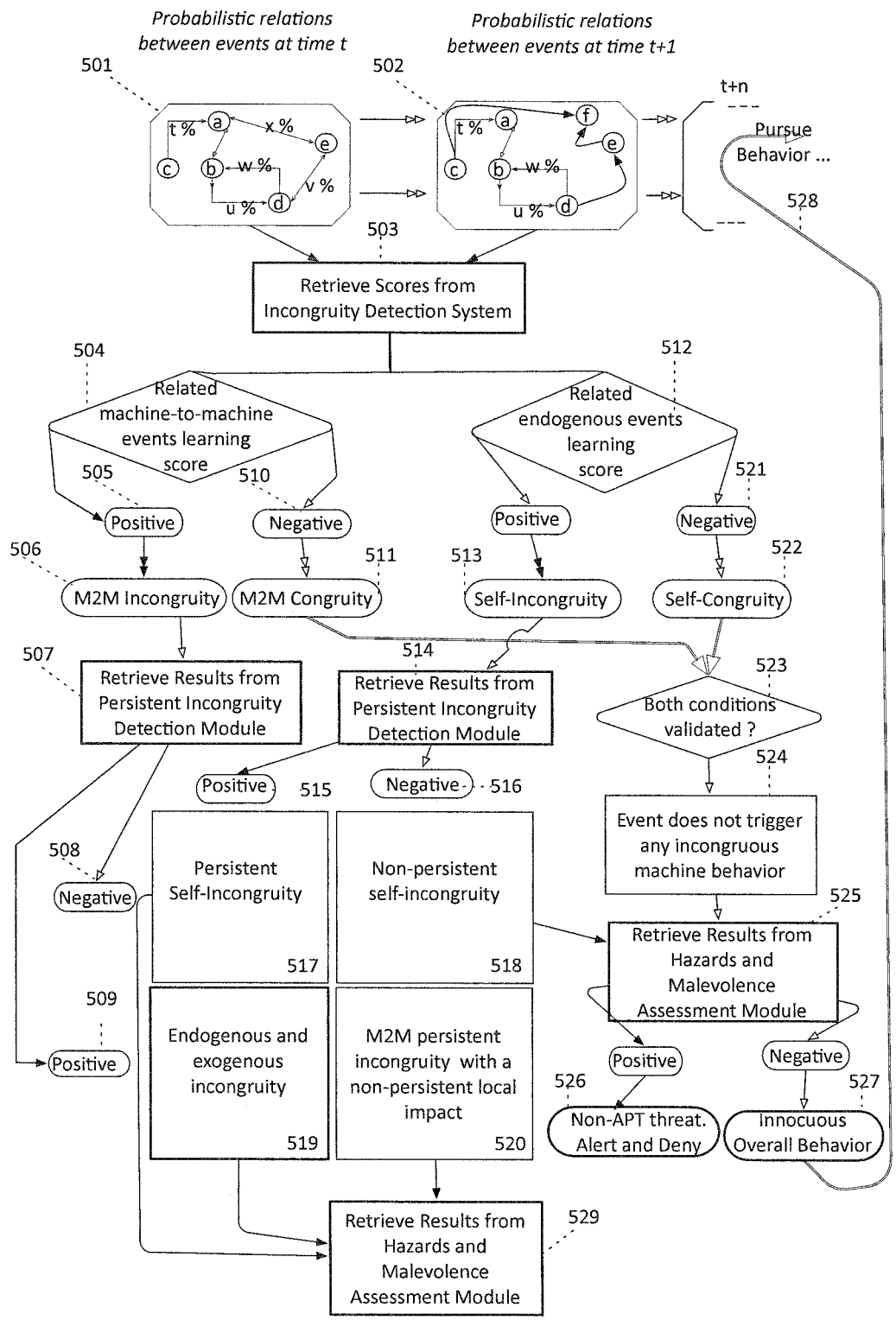
FIGS. 8A-8B depict a first part of the schematic diagram of an example process executed by the system of FIG. 1A to detect and identify Advanced Persistent Threats (APTs) in the behaviors of nodes, machines and components, and hereinafter referred as "an APT detection module," in accordance with some implementations.
Figure 8B:
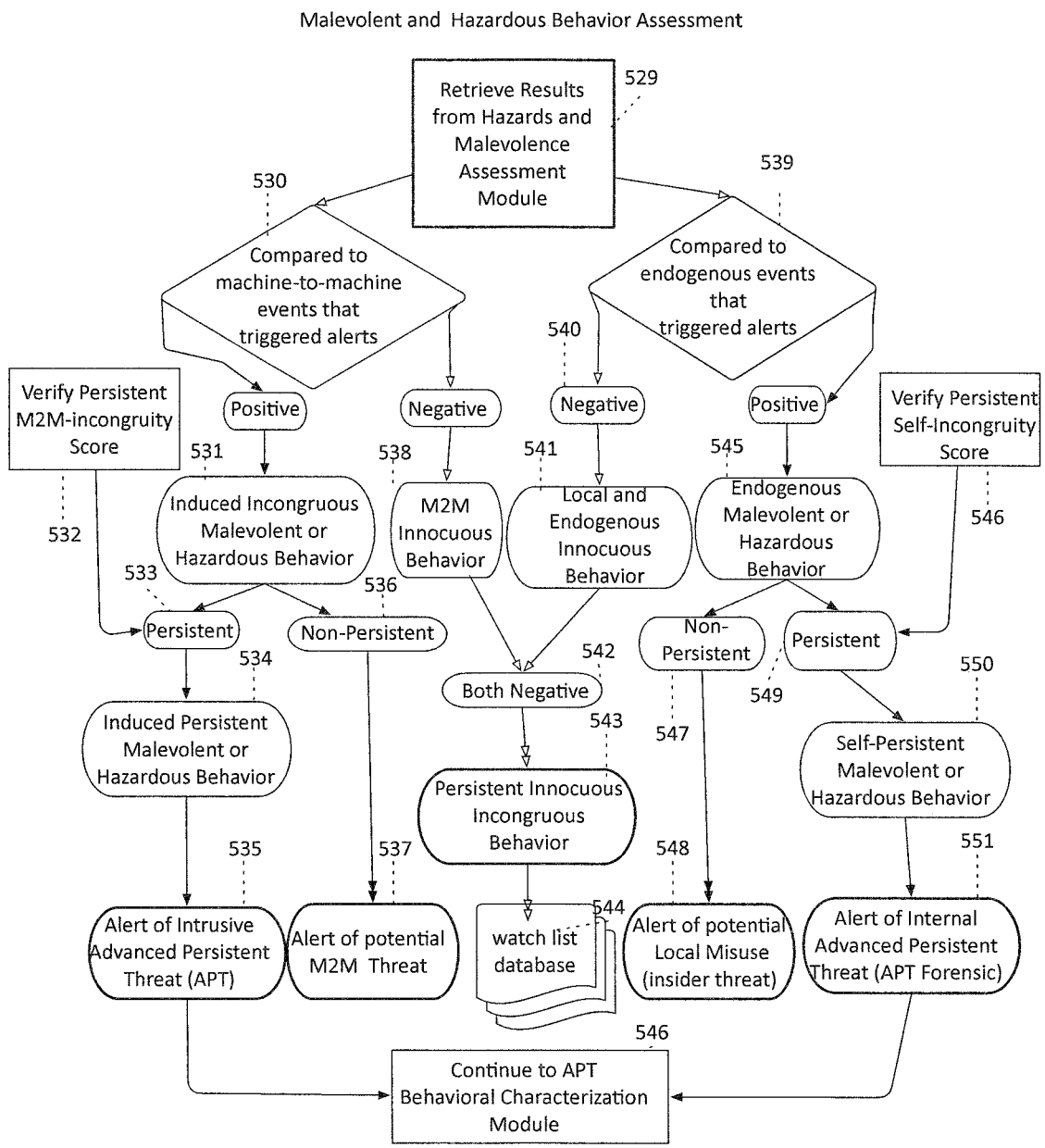

FIGS. 8A-8B illustrate an example process of a preliminary phase of the Advanced Persistent Threat Detection Module 12 (FIG. 1A) or 22 (FIG. 2).

Tasks 501 and 502 represent the dynamic evolution of interactions between machine components, symbolizing functionalities fully detailed in FIG. 4. The probabilistic scores of incongruity levels are retrieved from the incongruity detection module (FIG. 5) in task 503.

A parallel reasoning method is conducted simultaneously on machine-to-machine events, and on endogenous events (referred to as "local events") in processes starting in tasks 504 and 512. The objective of this parallel computation is to compare the "self-incongruous" behavior of a machine with the potential incongruity of its behavior towards other machines. This functionality of the present disclosure has an objective of emulating a "situational awareness" learning inside a machine.

"Self-incongruity" is the capability, for a system, to identify its own incongruous behaviors, i.e. behaviors that do not match what would be expected by this system. Self-congruity, reversely, is the expression of a predicted behavior that is probabilistically close to its self-predictions. Filters 504 and 512 calculate endogenous (local) and exogenous (machine to machine) incongruity scores in order to categorize and qualify the forms of detected incongruities in multiple classes 517, 518, 519 and 520. Although four classes are shown in FIGS. 8A-8B, it is noted that in other examples, a different number of classes can be used. If filters 504 and 512 fail to retrieve scores that would validate one or the other condition (local, or M2M), in task 523, then the hypothesis of an incongruous behavior is not validated (524). In task 525, if the retrieval of scores of hazardous and malevolent behavior probability (from module described in FIG. 6) returns a negative output (task 527), then the observed behavior is declared and learned as innocuous (527), and the behavior (interaction, data transfer, port hopping, etc.) is pursued (528).

Other scenarios 517, 519 and 520 will trigger further computation as to determine the probability of a threat, in task 529. Tasks 530 and 539 compare the observed events with other events that triggered similar alerts, and similar events (by probabilistic distance) that triggered different alerts. This process is repeated for local events (539) and for machine-to-machine events (530). In tasks 546 and 532, machine-to-machine behavioral persistent incongruity (532) and persistent self-incongruity score (546) are checked to validate if the detected induced incongruous malevolent behavior (531) is persistent, or if the endogenous malevolent or hazardous behavior (on local events, task 545) is also persistent. According to the scores obtained by the method on the persistence, malevolence and incongruity levels of observed behaviors, the proposed method allows sorting the analyzed behaviors in three categories: induced persistent malevolent or hazardous behavior (534), persistent innocuous incongruous behavior (543) and self-persistent malevolent or hazardous behavior (550). Advantageously, this sorting method allows qualifying threats regardless of the administrative rights, privileges, attributed legitimacy or status of the observed machines, networks or users of these networks and machines. Before continuing to the APT (advanced persistent threat) module in task 546, the method allows alerting users or network administrators on the potentiality of an intrusive advanced persistent threat (535), a local misuse (548), an internal advanced persistent threat, referred to as network compromising or as "insider threat" (551), or a more specific M2M threat (machine to machine—537).

In a last phase, in FIGS. 9A-9B, the findings produced by the method on the potentiality of an advanced persistent threat (task 601), a M2M threat (602), a local misuse (603) and an insider threat (604) are gathered and compiled in a statistical database (605), summarizing the behavioral characteristics, the Bayesian graphs and conditional probabilities of occurrence of behavioral characteristics (607). FIGS. 9A-9B illustrate a process of generating a probabilistic characterization of APT behavior. Examples of archetypal behaviors are listed in the database (606) of FIGS. 9A-9B: opening of new I/O ports, calls of unexpected encryption processes, unexpected data obfuscation, unexpected access to a signature database, incongruous listing of active endpoints, surprising patch being applied over a process, unexpected generation of new code, etc. In order to validate the potentiality of an APT, the method and system allows for a conditional probabilistic discrimination of the occurrence of several characteristics of APTs: existence of a reconnaissance behavior (612), signs or probabilistic evidence of an intrusive behavior (615), characteristics of a legitimating behavior (621), probabilistic evidence of a delayed triggering behavior (627) and the search for characteristics of synchronization behavior (633).

In task 608, the method and system calculates the relative frequency of occurrence $F_n$ of identified behavior, knowing the overall population behavior, expressed in their relative frequencies of occurrences, of surrounding, local or network nodes. This probabilistic assessment allows calculating the velocity of change of configuration V1 in the observed network, in task 609.

In task 610, the temporal distance $D_n$ between captured behaviors $B_1, B_2, \ldots, B_n$ is calculated; knowing the overall time distances $J_n$ of considered node compared to other nodes in which it has been in interaction. The purpose of calculating temporal distances, expressing the most probable time between two interactions, knowing the probabilities of length between interactions in the overall network or neighborhood, is to appreciate the velocity change V2 of relative temporal distances between events (611).

When the behavioral characteristics of a reconnaissance scheme are identified, based of the knowledge accumulated in database (606), then the counter for reconnaissance attempts $R_n$ is incremented (614). In task 615, the same calculation method is applied to the identification of intrusion behavior, which leads to increasing the counts of intrusion attempts $I_n$ in task 617.

In task 618, the probability of intrusion following a reconnaissance behavior is computed from the findings of tasks 612 and 615, expressed as the Bayesian probability of $I_n$, knowing $R_n$. The output of this probabilistic scoring is the "Prepared Intrusion" score ($PI_n$), which expresses the probability that a given intrusive behavior has been prepared and deliberate (619). The objective is to measure the intrinsic variation over time of $PI_n$ in order to assess the possibility of a sustained intrusion behavior.

In task 621, recorded behaviors are tested for the existence of characteristics of legitimating behavior. A legitimating behavior aims at increasing the level of perceived trustworthiness of a behavior, a component, an identity or a constituent into a network or a machine, or interacting with a network or a machine. Task 623 records the number of occurrences of legitimating attempts $L_n$, as well as their conditional relative frequencies of occurrence. The probability of a legitimating strategy, knowing the probability of an intrusion strategy, for a given behavior $B_n$, is then computed in order to measure the existence of a potential conditional probability between discovered intrusion attempts, and legitimating attempts, in a scoring expressed in task 624. This calculation allows elaborating a "Planned Deception Score $Pd_n$," expressing the probability than an observed intrusion has been conditioned, or is probabilistically related to a planned deception (legitimating strategy).

In task 627, the method calculates the relative triggering delays, as probabilistically expressed in comparison with delays on neighboring nodes or machines, or nodes and machines belonging to the same archetype, in order to identify incongruous triggering of operations (comprising characteristics of over-delayed interaction, slowed interaction, mismatch of coordination with other co-dependent triggering processes, and other archetypes of delaying behaviors). In task 629, behaviors with the highest probability weight of a delayed, or delaying behavior, are recorded (traced and described in a database), and the counter for delayed triggering attempts is incremented (629). When a legitimating strategy is detected and probabilistically determined (621-623), knowing the probability of the presence of characteristics of a delayed triggering behavior (627-629), then the system calculates the probability of a misuse of legitimacy $P(T_n|L_n)$ in task 630. The evolution of this score over time allows calculating an "Active Ploy Score" $Pa_n$, which measures the sustained and maintained behavior of legitimacy misuse over time [632].

In task 633, probabilistic evidence of data transfer and signals exchange behaviors, among the list of watched behaviors [606], are extracted from the Bayesian belief networks (Bbn) overseeing the dynamic transformation of the network (FIG. 4). Not relying on a preconceived and inert and/or configurable model, the task of generating a Bayesian belief network generates a unique proper and specific model based on the learning of the conditional probabilistic attempts of data synchronization between several nodes of the network ($A_1$, $A_2$ . . . $A_n$), knowing the points of data emission ($B_1$, $B_2$, . . . Bn). The objective of this machine learning in [633-635] is to establish the probabilistic likelihood that the observed network component (software or electronic) or machine is attempting to incongruously displace, transport, transfer, access an input-output port, take control of a communication process, synchronize data between an internal (local events, system) to an external machine (e.g. 12, 13 and 14, in FIG. 2) or memory or external network devices (16 in FIG. 2). Instead of depending on previously taught models, or previously recorded list of authorized ports of communication or transfer processes, the method of the invention allows measuring the attempts of incongruous synchronizations of data $S_n$, in a specific context, knowing the history of interaction between nodes and components, knowing the probabilities of the characteristics of behaviors of each interacting, connecting or interrelating machines or network components and constituents (635).

When a delayed triggering strategy is detected and probabilistically determined (627-629), knowing the probability of the presence of characteristics of a synchronization behavior (633-635), then the system calculates the probability of a synchronization following a delayed triggering $P(Sn|Tn)$ in task 637. The evolution of this score over time allows calculating a "Covert Exfiltration Score" ($Ce_n$), which measures the probability of an illicit and covered operation of data transfer and synchronization (637-638).

In task 639, the method allows calculating the probability that the above events (612, 615, 621, 627, 633) are interrelated and linked, as to determine the probability of a deliberate strategy of implement an advanced persistent threat (APT), by computing the probability of combined events, using the probabilistic formula:

$$P(S_n | T_n \cap R_n) = \frac{P(S_n \cap T_n \cap L_n \cap I_n \cap R_n)}{P(T_n \cap L_n \cap I_n \cap R_n)}$$

The output of this probabilistic estimation is the "Coordination Score" $CS_n$, which expresses the possibility, as a probability score, of an existence of a coordination between events of reconnaissance behavior (612), intrusion or intrusiveness (615), legitimating or elevation of rights (621), delayed triggering (627) and synchronization (633).

In task 641, a measure of conditional independence allows estimating if the relationships between the evidence of behaviors that can probably be linked to an APT campaign or attack are dependent when another event of the same classes occur. This conditional dependence is measured by an algorithm encompassing the variables $Pi_n$, $Pd_n$, $Pa''$, $Ce_n$, $V_1$, $V_2$, $F_n$, $D_n$ and $CS_n$ under the following form:

$$E(Xi, XjC) = \sum_{X_i, X_j, C} P(X_i, X_j, C) \log \frac{P(X_i, X_jC)}{P(X_iC)P(X_jC)}$$

In task 642, a relative variation of the velocity of transformation of all the above variables $Pi_n$, $Pd_n$, $Pa''$ and $Ce_n$ is calculated as to determine a the relative speed of activation of the identified Advanced Persistent Threat, knowing the relative variation of nodes and components interactions in the network or machine.

In task 643, the APT intensity is measured using a technique similar to a method referred to as K2 Bayesian scoring, which results are recorded, for each component, each node, or each machine (641) and then displayed when positive, as signaling a strong probability of the presence of an Advanced Persistent Threat into the system, the network, or in the interactions between the observed network and other external components or networks.

In task 645, the values of learned variables can be displayed through a secured access, for further use such as security auditing, forensics, alert and deterrence of intruders, alert of misuse or illicit manipulation of data, and various warnings concerning potential security breaches in the protected system, machine or network (645). Alternatively, the information can be transmitted to the system itself (via a local event, without an external communication link), if the network or system designer have opted for a fully autonomous configuration, without any explicit information communicated to a human supervisor (646). Advantageously, this functionality of the invention allows automating a network defense system, or a machine defense system, for applications in the field of robotics, or for environments that could be dangerous for human beings (contaminated sites, battlefield, epidemics, emergency responses, etc.).

Otherwise, the method and system allows for alerting a human expert and/or administrator with a detailed description of the nodes, components or machines that displayed a potentially malevolent behavior (through the hazardous and malevolent assessment module, 21 in FIG. 2), the presence of incongruous behaviors, within the observed network, machine or in external components dialoguing and interacting with the network (20 in FIG. 2), and finally, identifying behaviors that can signal the presence of a sophisticated and deliberate Advanced Persistent Threat into the machine or system equipped with the invention (module 22 in FIG. 2). When a positive result is obtained, a counter-measure can be undertaken, either by human means, or by machine automated means, if warranted, in task 647. When such a counter-measure or deterrence operation has, or has not, been undertaken, the method and system pursues its machine learning by continuing its behavioral intelligence and learning at task 101.

In further examples, behavioral fencing can be provided, by adding sensors to fences and learning their immediate surroundings (for example, by watching shapes, sounds, visual inputs from nano-cameras, and learn the behaviors of objects or people around the fences). That would be very useful to create virtual fences around physical ones, or without the physical fences at all.

A method and system can also provide dynamic behavioral fencing of incongruous behaviors, where machine learning, at network, system and node levels, is delimiting the nature, geography, and range of authorized behaviors in a given machine or network, by injecting machine learning from another setting or machine or network, or by autonomously learning the probabilistic assessment of the expected incongruity or congruity of observed behaviors.

Such system or method delivers a probabilistic assessment of machine or network areas, numerical or physical, where a behavior displays a probably of incongruous or hazardous expected purpose.

As noted above, processes according to some implementations can be performed by machine-readable instructions that are loaded for execution on at least one processor. A processor can include a microprocessor, microcontroller, a physical processor module or subsystem, a programmable integrated circuit, a programmable gate array, or another physical processing circuit.

Data and instructions are stored in respective storage devices, which are implemented as one or multiple non-transitory computer-readable or machine-readable storage media. The storage media can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of detecting intrusion on a machine of a network, the method comprising:
    monitoring, continuously by a system including a processor and sensors, behavioral characteristics of at least a first machine component of the machine of the network and at least a further machine component;
    generating, by the system through unsupervised learning, an endogenous and unsupervised Bayesian model that represents interrelations between local events and machine-to-machine interactions between at least the first machine component and at least the further machine component, the generating comprising:
        discovering machine components interacting with each other through scanning and analyzing the local events and the machine-to-machine interactions, the discovered machine components including the first machine component;
        observing, by the system, interactions of the discovered machine components;
        learning behavioral characteristics for each discovered machine component, wherein the learned behavioral characteristics for a machine component includes any one or more of:
            a relative frequency of interactions with the machine component based on a ratio between a frequency of interactions of the machine component to an overall frequency of a population of interactions,
            a relative specificity of interactions, based on a proportion of the interactions of the machine component that are specifically addressed to a receiving machine component,
            a relative mortality of the interactions of the machine component, the relative mortality based on a diminishing proportion of the interactions of the machine component with respect to an overall population of events over time,
            a relative mutual intensity of interactions based on a number of mutual interactions between the machine component and another machine component, compared to a Bayesian average of mutual interactions,
            a targeted intensity based on a proportion of targeting the machine component, as compared to a Bayesian average of a number of untargeted interactions in an overall population of interactions,
            a community index based on a number of interactions that present a behavior parallelism towards the machine component, and
            a relative bandwidth usage of the machine component;
        generating a Bayesian directed acyclic graph representing observed interactions between the discovered machine components;
        auto-generating conditional relationships between the learned behavioral characteristics;
        determining probabilities of newly discovered interactions, based on probabilities of other interactions of the machine or network; and
        discovering a new machine component to allow discovery of an unexpected behavior in the machine or network;
    detecting, by the system in real-time using the monitored behavioral characteristics and the generated Bayesian model, an incongruity of a behavior of at least the first machine component and the machine-to-machine interactions, wherein the incongruity is detected based on determining a singularity of the local events and the machine-to-machine interactions, and a discordance between a calculated expectation of the system and an observed behavior and the machine-to-machine interactions, wherein the incongruity of the behavior of at least the first machine component comprises an unexpected behavior of at least the first machine component, and wherein the detecting of the incongruity comprises:
        extracting the probabilities of the newly discovered interactions, measuring a behavioral incongruity of an observed behavior of the new machine component, based on a probabilistic congruity of a behavior of another machine component;

calculating dynamic distortions between the learned behavioral characteristics and newly observed behavioral characteristics of the observed behavior of the new machine component, wherein a dynamic distortion of the dynamic distortions represents a mismatch based on a gap between probabilities of behaviors of the discovered machine components predicted by the Bayesian model and probabilities of the observed behavior exceeding a specified threshold; and identifying, based on the dynamic distortions, at least the first machine component that most increases an overall incongruity of machine behavior or network behavior;

based on the detected incongruity, automatically assessing hazardous and malevolent characteristics of the behavior of at least the first machine component and the machine-to-machine interactions; and performing, by the system, an action with respect to at least the first machine component in response to the assessment.

2. The method of claim 1, wherein the detecting of the incongruity comprises detecting variations inserted into the machine by an intruder to acclimate the Bayesian model to a presence of incongruous behaviors.

3. The method of claim 2, wherein the detecting of the variations inserted into the machine by the intruder to acclimate the Bayesian model to the presence of incongruous behaviors comprises:

calculating variations of behavior of interactions between a set of machine components, comparing the calculated variations to previously learned behavioral ranges of interactions of the set of machine components, and based on the comparing of the calculated variations, modifying a range of acceptable incongruous variations of behavior in association with the Bayesian model.

4. The method of claim 1, wherein the detecting of the incongruity is based on an autonomous probabilistic weighting of relative and interrelated frequencies of behavioral occurrences, performed without human supervision, human teaching, or a priori taught model of interactions, and wherein the generating of the Bayesian model comprises generating the Bayesian model that records over time a probabilistic realization of a behavior, based on knowledge of characteristics, intensity, and measures of other learned behaviors over time.

5. The method of claim 1, wherein the monitoring of the behavioral characteristics of at least the first machine component comprises monitoring behavioral characteristics of a node in a network or behavioral characteristics of the machine or a portion of the machine.

6. The method of claim 1, further comprising:
detecting an incongruity of the new machine component.

7. The method of claim 1, wherein the calculated expectation of the system is based on learned endogenous logic of the system, the learned endogenous logic learned from previous operations of the system.

8. A system comprising:
at least one processor; and
a non-transitory storage medium storing instructions executable on the at least one processor to:

receive information of monitored behavioral characteristics of at least a first machine component of a machine of a network and at least a further machine component;

generate, through unsupervised learning, an unsupervised Bayesian model that represents interrelations between local events and machine-to-machine interactions between at least the first machine component and at least the further machine component, the generating comprising:

discovering machine components interacting with each other through analyzing the local events and the machine-to-machine interactions, the discovered machine components including the first machine component;

observing interactions of the discovered machine components;

learning behavioral characteristics for each discovered machine component, wherein the learned behavioral characteristics for a machine component includes a relative frequency of interactions with the machine component based on a ratio between a frequency of interactions of the machine component to an overall frequency of a population of interactions;

generating a Bayesian directed acyclic graph representing observed interactions between the discovered machine components;

auto-generating conditional relationships between the learned behavioral characteristics;

determining probabilities of newly discovered interactions, based on probabilities of other interactions of the machine or network; and discovering a new machine component to allow discovery of an unexpected behavior in the machine or network;

detect, in real-time using the monitored behavioral characteristics and the generated Bayesian model, an incongruity of a behavior of at least the first machine component and the machine-to-machine interactions, wherein the incongruity is detected based on determining a singularity of the local events and the machine-to-machine interactions, and a discordance between a calculated expectation of the system and an observed behavior and the machine-to-machine interactions, wherein the incongruity of the behavior of at least the first machine component comprises an unexpected behavior of at least the first machine component, and wherein the detecting of the incongruity comprises:

extracting the probabilities of the newly discovered interactions, measuring a behavioral incongruity of an observed behavior of the new machine component, based on a probabilistic congruity of a behavior of another machine component;

calculating dynamic distortions between the learned behavioral characteristics and newly observed behavioral characteristics of the observed behavior of the new machine component, wherein a dynamic distortion of the dynamic distortions represents a mismatch based on a gap between probabilities of behaviors of the discovered machine components predicted by the Bayesian model and probabilities of the observed behavior exceeding a specified threshold; and identifying, based on the dynamic distortions, at least the first machine component that most increases an overall incongruity of machine behavior or network behavior;

based on the detected incongruity, automatically assess hazardous and malevolent characteristics of the behavior of at least the first machine component and the machine-to-machine interactions; and perform an action with respect to at least the first machine component in response to the assessment.

9. The system of claim 8, wherein the detecting of the incongruity comprises detecting variations inserted into the machine by an intruder to acclimate the Bayesian model to a presence of incongruous behaviors.

10. The system of claim 9, wherein the detecting of the variations inserted into the machine by the intruder to acclimate the Bayesian model to the presence of incongruous behaviors comprises:
calculating variations of behavior of interactions between a set of machine components,
comparing the calculated variations to previously learned behavioral ranges of interactions of the set of machine components, and
based on the comparing of the calculated variations, modifying a range of acceptable incongruous variations of behavior in association with the Bayesian model.

11. The system of claim 8, wherein the detecting of the incongruity is based on an autonomous probabilistic weighting of relative and interrelated frequencies of behavioral occurrences, performed without human supervision, human teaching, or a priori taught model of interactions, and wherein the generating of the Bayesian model comprises generating the Bayesian model that records over time a probabilistic realization of a behavior, based on knowledge of characteristics, intensity, and measures of other learned behaviors over time.

12. The system of claim 8, wherein the monitoring of the behavioral characteristics of at least the first machine component comprises monitoring behavioral characteristics of a node in a network or behavioral characteristics of the machine or a portion of the machine.

13. The system of claim 8, wherein an expectation of the system is based on learned endogenous logic of the system, the learned endogenous logic learned from previous operations of the system.

14. The system of claim 8, wherein the Bayesian model is for a first stage of a plurality of different stages at respective time points, and wherein the instructions are executable on the at least one processor to:
generate, through unsupervised learning, additional Bayesian models for other stages of the plurality of different stages, wherein the Bayesian models for the plurality of different stages are changed from one another based on discovery of learned variables representing new interactions between machine components and discovery of new machine components.

15. A non-transitory machine-readable storage medium comprising instructions that upon execution cause a system to:
monitor behavioral characteristics of at least a first machine component;
generate, through unsupervised learning, a Bayesian model that represents interrelations between events and machine-to-machine interactions between at least the first machine component of a machine in a network and at least a further machine component, the generating comprising:
discovering machine components interacting with each other through analyzing the events and the machine-to-machine interactions, the discovered machine components including the first machine component;
observing interactions of the discovered machine components;
learning behavioral characteristics for each discovered machine component, wherein the learned behavioral characteristics for a machine component includes a relative frequency of interactions with the machine component based on a ratio between a frequency of interactions of the machine component to an overall frequency of a population of interactions;
generating a Bayesian directed acyclic graph representing observed interactions between the discovered machine components;
determining probabilities of newly discovered interactions, based on probabilities of other interactions of the machine or network; and
discovering a new machine component to allow discovery of an unexpected behavior in the machine or network;
detect, in real-time using the monitored behavioral characteristics and the generated Bayesian model, an incongruity of a behavior of at least the first machine component and the machine-to-machine interactions, wherein the incongruity is detected based on determining a singularity of the events and the machine-to-machine interactions, and a discordance between a calculated expectation of the system and an observed behavior and the machine-to-machine interactions, wherein the incongruity of the behavior of at least the first machine component comprises an unexpected behavior of at least the first machine component, and wherein the detecting of the incongruity comprises:
extracting the probabilities of the newly discovered interactions,
measuring a behavioral incongruity of an observed behavior of the new machine component, based on a probabilistic congruity of a behavior of another machine component;
calculating dynamic distortions between the learned behavioral characteristics and newly observed behavioral characteristics of the observed behavior of the new machine component, wherein a dynamic distortion of the dynamic distortions represents a mismatch based on a gap between probabilities of behaviors of a discovered machine component predicted by the Bayesian model and probabilities of the observed behavior exceeding a specified threshold; and
identifying, based on the dynamic distortions, at least the first machine component that most increases an overall incongruity of machine behavior or network behavior;
discover, based on the detected incongruity, that the behavior of at least the first machine component is a new potentially harmful behavior that comprises a zero-day vulnerability; and
perform a counter-measure action comprising controlling at least the first machine component to address the zero-day vulnerability.

16. The non-transitory machine-readable storage medium of claim 15, wherein the Bayesian model is for a first stage of a plurality of different stages at respective time points, and wherein the instructions upon execution cause the system to:

generate, through unsupervised learning, additional Bayesian models for other stages of the plurality of different stages, wherein the Bayesian models for the plurality of different stages are changed from one another based on discovery of learned variables representing new interactions between machine components and discovery of new machine components.

17. The non-transitory machine-readable storage medium of claim 16, wherein the detecting of the incongruity comprises detecting variations inserted into the machine by an intruder to acclimate the Bayesian model to a presence of incongruous behaviors.

18. The non-transitory machine-readable storage medium of claim 17, wherein the detecting of the variations inserted into the machine by the intruder to acclimate the Bayesian model to the presence of incongruous behaviors comprises:
   calculating variations of behavior of interactions between a set of machine components,
   comparing the calculated variations to previously learned behavioral ranges of interactions of the set of machine components, and
   based on the comparing of the calculated variations, modifying a range of acceptable incongruous variations of behavior in association with the Bayesian model.

* * * * *